United States Patent
Hamada et al.

(10) Patent No.: US 8,204,789 B2
(45) Date of Patent: Jun. 19, 2012

(54) APPARATUS AND METHOD FOR RECEIVING A TRANSPORT STREAM CONTAINING A PLURALITY OF CONTENT DATA

(75) Inventors: Ichiro Hamada, Kanagawa (JP); Susumu Nagano, Kanagawa (JP); Shintaro Tsutsui, Tokyo (JP)

(73) Assignee: Sony Corporation (JP)

( * ) Notice: Subject to any disclaimer, the term of this patent is extended or adjusted under 35 U.S.C. 154(b) by 766 days.

(21) Appl. No.: 11/982,505

(22) Filed: Nov. 2, 2007

(65) Prior Publication Data
US 2008/0168508 A1    Jul. 10, 2008

Related U.S. Application Data

(62) Division of application No. 09/744,121, filed as application No. PCT/JP00/03199 on May 18, 2000, now Pat. No. 7,310,810.

(30) Foreign Application Priority Data

| May 19, 1999 | (JP) | .................................... 11-138849 |
| May 19, 1999 | (JP) | .................................... 11-138850 |
| May 19, 1999 | (JP) | .................................... 11-138851 |
| May 19, 1999 | (JP) | .................................... 11-138852 |

(51) Int. Cl.
 *G06Q 30/00* (2012.01)
 *H04N 7/173* (2011.01)
 *G06F 9/44* (2006.01)
 *G06F 9/445* (2006.01)
 *G06F 15/16* (2006.01)

(52) U.S. Cl. ........... 705/26.1; 725/93; 725/91; 717/173; 717/178; 709/231

(58) Field of Classification Search .................. 725/105, 725/91, 93; 705/26.1, FOR. 108; 717/173, 717/178; 709/231
See application file for complete search history.

(56) References Cited

U.S. PATENT DOCUMENTS 3,534,266 A    10/1970    Halstead et al.
(Continued)

FOREIGN PATENT DOCUMENTS

EP    868041    9/1998
(Continued)

OTHER PUBLICATIONS

P.A. Sarginson, MPEG-2: Overview of the systems layer, Feb. 1996, BBC Research and Development.*

(Continued)

*Primary Examiner* — Hoang-Vu A Nguyen-Ba
(74) *Attorney, Agent, or Firm* — Lerner, David, Littenberg, Krumholtz & Mentlik, LLP

(57) ABSTRACT

To compensate a failure in downloading of music piece data. For example, when a viewer instructs purchase of a music pieceC to an IRD at a timing t0 during the sixth transmission of music piece data, the music piece data to be transmitted for the seventh time immediately after the instruction is usually downloaded. When the downloading of the music piece data transmitted for the seventh time fails for some reason, downloading is re-executed on music piece data to be transmitted for the eighth time. The music piece data for the final transmission time in each of musical pieces is used for re-execution. Timing at which downloading of the music piece data transmitted for the time immediately preceding the final time can be instructed is set as purchase limit time by using elapsed time since program start time.

14 Claims, 20 Drawing Sheets

U.S. PATENT DOCUMENTS

| | | | |
|---|---|---|---|
| 5,311,325 A | 5/1994 | Edwards et al. | |
| 5,610,653 A | 3/1997 | Abecassis | |
| 5,619,247 A | 4/1997 | Russo | |
| 5,850,218 A | 12/1998 | LaJoie et al. | |
| 5,879,246 A * | 3/1999 | Gebhardt et al. | 473/409 |
| 6,032,180 A * | 2/2000 | Nishikawa | 725/115 |
| 6,157,673 A * | 12/2000 | Cuccia | 375/240 |
| 6,215,530 B1 * | 4/2001 | Wasilewski | 348/731 |
| 6,430,357 B1 * | 8/2002 | Orr | 386/244 |
| 6,782,553 B1 | 8/2004 | Ogawa et al. | |
| 7,310,810 B1 * | 12/2007 | Hamada et al. | 725/91 |
| 2005/0226604 A1 * | 10/2005 | Kawamura et al. | 386/95 |

FOREIGN PATENT DOCUMENTS

| | | |
|---|---|---|
| EP | 0928111 A2 * | 7/1999 |
| JP | 02-178795 | 7/1990 |
| JP | 02-199981 | 8/1990 |
| JP | 3-500476 | 1/1991 |
| JP | 5/122674 A | 5/1993 |
| JP | 5-176306 A | 7/1993 |
| JP | 6-4996 A | 1/1994 |
| JP | 06-004996 A1 | 1/1994 |
| JP | 07-123392 | 5/1995 |
| JP | 07-162832 | 6/1995 |
| JP | 07-182837 | 7/1995 |
| JP | 7-182837 A | 7/1995 |
| JP | 7-203417 A | 8/1995 |
| JP | 9-65308 A | 3/1997 |
| JP | 09-107530 | 4/1997 |
| JP | 9-135434 A | 5/1997 |
| JP | 09-182036 | 7/1997 |
| JP | 9-507359 A | 7/1997 |
| JP | 10/105193 | 4/1998 |
| JP | 10-145342 A | 5/1998 |
| JP | 10-155140 | 6/1998 |
| JP | 10-233745 A | 9/1998 |
| JP | 10-257001 A | 9/1998 |
| JP | 10-294924 * | 11/1998 |
| JP | 10-301904 | 11/1998 |
| JP | 11-055203 | 2/1999 |
| JP | 11-112451 A | 4/1999 |
| WO | 95/19091 A1 | 7/1995 |
| WO | 9836569 | 8/1998 |
| WO | 99/06991 A1 | 2/1999 |
| WO | 99/21186 | 4/1999 |
| WO | 99/25082 | 5/1999 |

OTHER PUBLICATIONS

Supplementary European Search Report, EP 00 92 9794.

* cited by examiner

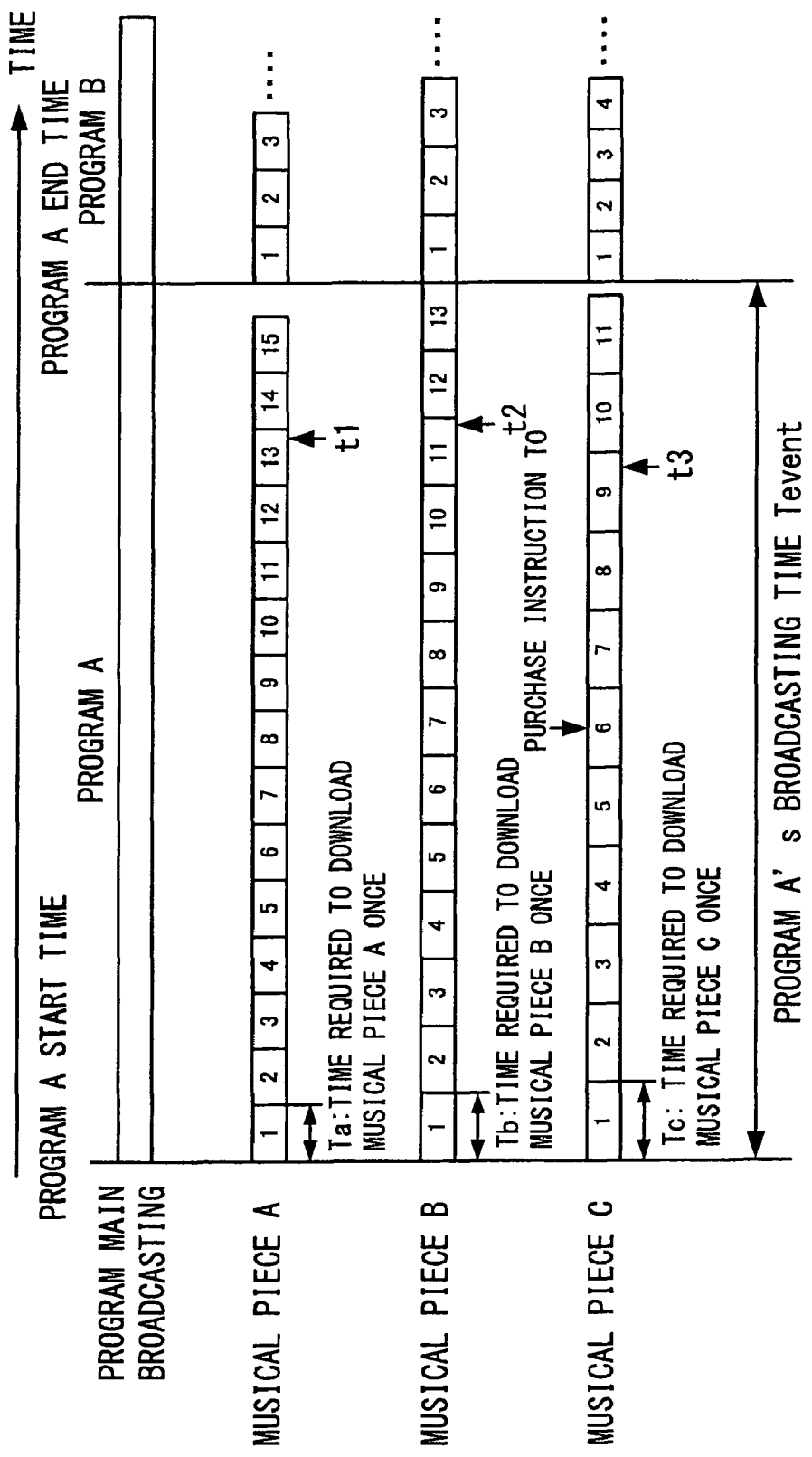

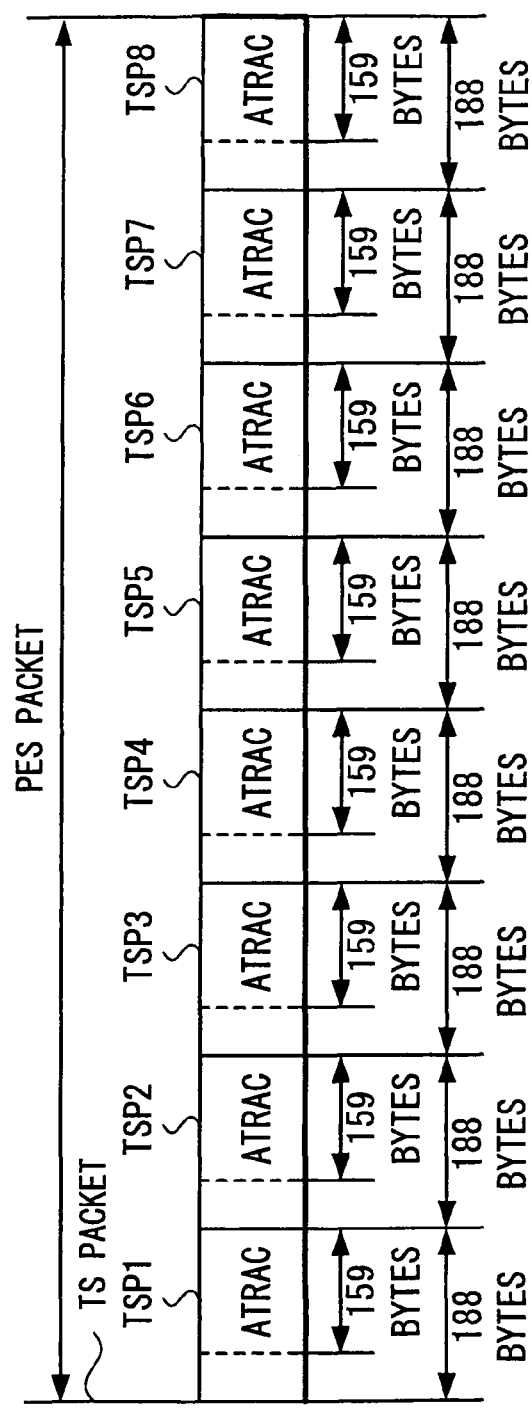
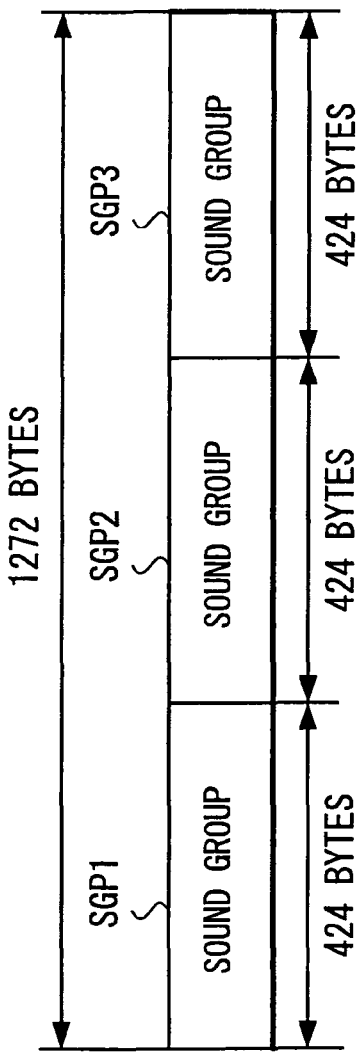
FIG. 5A
FIG. 5B

FIG. 9

| 29 | CS[0] | CS[1] | CS[2] | CS[3] | CS[4] | CS[5] | CS[6] | CS[7] |
|---|---|---|---|---|---|---|---|---|
| 30 | AT[0][0] | AT[0][1] | | | | | | AT[0][7] |
| | AT[1][0] | | | | | | | |
| | AT[2][0] | | | | | | | |
| 188 | AT[158][7] | | | | | | | AT[158][7] |

APPARATUS AND METHOD FOR RECEIVING A TRANSPORT STREAM CONTAINING A PLURALITY OF CONTENT DATA

CROSS-REFERENCE TO RELATED APPLICATION

This application is a divisional of U.S. application Ser. No. 09/744,121, filed on Mar. 19, 2001, now U.S. Pat. No. 7,310,810, which is a national stage application under 35 U.S.C. §371 of International Application No. PCT/JP00/03199, filed May 18, 2000, which claims priority from Japanese Application Nos. JP 11-138849, JP 11-138850, JP 11-138851, and JP 11-138852, each filed on May 19, 1999, the disclosures of which are incorporated herein by reference.

TECHNICAL FIELD

The present invention relates to broadcasting equipment and method, receiving equipment and method, and a medium and, more particularly, to broadcasting equipment and a method, receiving equipment and a method, and a medium suitable for use in the case of providing service of downloading contents data.

BACKGROUND ART

Digital satellite broadcasting such as, for example, Sky PerfecTV (trademark) is being widespread. The digital satellite broadcasting can transmit a signal of higher quality as compared with existing analog broadcasting and realizes a large number of channels. In such digital satellite broadcasting, channels dedicated to sports, movies, music, news and the like are prepared. A music channel is one of popular channels among the dedicated channels.

When a view watches such a music channel, he/she may like a music piece being broadcasted and want to purchase a CD (Compact Disc) or the like containing the musical piece. In such a case, it is convenient that data on the music piece can be downloaded while watching the music channel. The applicant of the present invention has proposed a system capable of multiplexing music piece encoded by using the ATRAC (Adaptive Transform Acoustic Coding) system with respect to main broadcasting signals (video signal and sound signal) of the music channel, distributing the resultant data, and charging the viewer who is purchasing (downloading) the ATRAC data, for example, in Japanese Patent Application No. 10-201731.

The ATRAC system is a compression coding system adopted in the case of recording audio data onto an MD (Mini Disc) (trademark).

In a system of distributing music piece data and charging the viewer who purchases it as described above, if purchase of a plurality of music piece data can be instructed in a lump and the plurality of music piece data can be downloaded in optimum order, efficiency with respect to time increases and music piece data of a larger amount can be downloaded within predetermined time. The conventional system has a problem that it does not have such a function.

In a pay-per-view carried out on a movie channel or the like in digital satellite broadcasting, purchasing (watching) a program from a midpoint of the program is not sufficiently worthy. Consequently, in the case where predetermined time is elapsed since the broadcasting start time of the program, purchase limitation time is set so that the program cannot be purchased.

In a system of distributing music piece and charging the viewer who is purchasing the data as described above, however, the purchase limitation time is not specified. There is consequently a problem such that a failure in downloading cannot be compensated.

Further, in a pay-per-view carried out on a movie channel or the like in digital satellite broadcasting, preview time (test-listening time) during which there is no charge for viewing is set. Consequently, the viewer can determine whether a program is worth viewing (purchasing) or not during the preview.

Such a system of distributing music piece data and charging the viewer who purchases it has, however, a problem that there is no regulation regarding test-listening of purchasable music piece data.

Furthermore, a receiving apparatus as a component of a system as described above has a problem that the apparatus cannot process the two kinds of music piece data simultaneously and independently of each other.

Further, in a system of distributing music piece data and charging the viewer who purchases it as described above, if purchase of plural music piece data can be instructed in a lump and the plural music piece data can be downloaded in an optimum order, efficiency with respect to time increases and music piece data of a larger amount can be downloaded within predetermined time. The conventional system has a problem that it does not have such a function.

DISCLOSURE OF INVENTION

An object of the present invention is to compensate failure in downloading by setting the purchase limitation time of music piece data in a system of downloading music piece data or the like.

An object of the present invention is to enable music piece data to be test-listened before the user purchases the music piece data in a system of downloading music piece data or the like.

An object of the present invention is to enable two kinds of music piece data compression coded in the ATRAC system and the MPEG2 system to be processed simultaneously and independently of each other in a system of downloading music piece data or the like.

An object of the present invention is to enable efficiency with respect to time to be improved and music piece data of a larger amount to be downloaded within predetermined time by optimizing the order of downloading plural music piece data in a system of downloading music piece data or the like The first invention is broadcasting equipment for multiplexing downloadable contents data together with program information onto a main broadcast signal and broadcasting resultant data, comprising:

purchase limit time setting means for setting purchase limit time for the contents data;

generating means for generating the program information including the purchase limit time; and multiplexing means for repeatedly multiplexing the same contents data and the program information a plurality of times onto the main broadcast signals of broadcasting time of one program, thereby generating a transport stream. By doing in this manner, a failure in downloading can be compensated by setting the purchase limit time corresponding to the contents data.

The second invention is the broadcasting equipment, wherein the purchase limit time setting means sets timing at which downloading of the contents data of a time immediately preceding the final time among the plurality of times can be instructed as the purchase limit time. By doing in this manner, it is possible to favorably set the purchase limit.

The third invention is the broadcasting equipment, wherein the contents data includes audio data encoded by the ATRAC system or audio data encoded by the MPEG 2 system. By doing in this manner, it becomes possible to favorably download the contents data including audio data encoded by the ATRAC system or audio data encoded by the MPEG system.

The fourth invention is a broadcasting method of a broadcasting equipment for multiplexing downloadable contents data together with program information onto a main broadcast signal and broadcasting resultant data, comprising:

a purchase limit time setting step of setting purchase limit time for the contents data;

a generating step of generating the program information including the purchase limit time; and a multiplexing step of repeatedly multiplexing the same contents data and the program information a plurality of times onto the main broadcast signals of broadcasting time of one program, thereby generating a transport stream. By doing in this manner, a failure in downloading can be compensated by setting the purchase limit time corresponding to the contents data.

The fifth invention is a medium for allowing broadcasting equipment for multiplexing downloadable contents data together with program information onto a main broadcast signal and broadcasting resultant data to execute a program comprising:

a purchase limit time setting step of setting purchase limit time for the contents data;

a generating step of generating the program information including the purchase limit time; and a multiplexing step of repeatedly multiplexing the same contents data and the program information onto the main broadcast signals of broadcasting time of one program, thereby generating a transport stream. By doing in this manner, a failure in downloading can be compensated by setting the purchase limit time corresponding to the contents data.

The sixth invention is receiving equipment for receiving a transport stream obtained by repeatedly multiplexing downloadable contents data together with program information onto a main broadcast signal a plurality of times, comprising:

receiving means for receiving an instruction of downloading the contents data from the user;

capturing means for capturing the contents from the transport stream in response to the download instruction received by the receiving means;

re-executing means for re-executing capture of the contents when the capturing means fails to capture the contents;

extracting means for extracting the program information corresponding to the contents data from the transport stream; and stopping means for stopping the receiving process of the receiving means in accordance with purchase limit time included in the program information. By doing in this manner, when the capture of contents fails, the capture of the contents is re-executed, and reception of a download instruction from the user is stopped according to the purchase limit time included in the program information. Thus, a failure in downloading can be compensated.

The seventh invention is the receiving equipment, wherein the contents data includes audio data encoded by the ATRAC system or audio data encoded by the MPEG2 system. By doing in this manner, it becomes possible to favorably download the contents data including audio data encoded by the ATRAC system or audio data encoded by the MPEG system.

The eighth invention is a receiving method of receiving equipment for receiving a transport stream obtained by repeatedly multiplexing downloadable contents data together with program information onto a main broadcast signal a plurality of times, comprising:

a receiving step of receiving an instruction of downloading the contents data from the user;

a capturing step of capturing the contents from the transport stream in response to the download instruction received in the receiving step;

a re-executing step of re-executing capture of the contents when the capturing step fails to capture the contents;

an extracting step of extracting the program information corresponding to the contents data from the transport stream; and a stopping step of stopping the receiving process of the receiving means in accordance with purchase limit time included in the program information.

The ninth invention is a medium for allowing a receiving equipment for receiving a transport stream obtained by repeatedly multiplexing downloadable contents data together with program information onto a main broadcast signal a plurality of times to execute a program comprising:

a receiving step of receiving an instruction of downloading the contents data from the user;

a capturing step of capturing the contents from the transport stream in response to the download instruction received in the receiving step;

a re-executing step of re-executing capture of the contents when the capturing step fails to capture the contents;

an extracting step of extracting the program information corresponding to the contents data from the transport stream; and a stopping step of stopping the receiving process of the receiving means in accordance with purchase limit time included in the program information. By doing in this manner, when the capture of contents fails, the capture of the contents is re-executed, and reception of a download instruction from the user is stopped according to the purchase limit time included in the program information. Thus, a failure in downloading can be compensated.

The tenth invention is receiving equipment for receiving a transport stream obtained by multiplexing plural encoded data encoded by different systems, comprising:

first extracting means for extracting first encoded data from the transport stream received;

first outputting means for outputting the first encoded data extracted by the first extracting means;

second extracting means for extracting second encoded data from the transport stream received;

decoding means for decoding the second encoded data extracted by the second extracting means to thereby generate audio data; and second outputting means for outputting the audio data generated by the decoding means. By doing in this manner, it becomes possible to process, for example, two kinds of music piece data simultaneously and independently.

The eleventh invention is the receiving equipment, wherein the first encoded data is audio data compression encoded by using an ATRAC system, and the second encoded data is audio data compression encoded by using an MPEG2 system. By doing in this manner, it becomes possible to process two kinds of music piece data compression encoded by the ATRAC system or MPEG 2 system simultaneously and independently.

The twelfth invention is a receiving method of receiving equipment for receiving a transport stream obtained by multiplexing a plurality of encoded data encoded by different systems, comprising:

a first extracting step of extracting first encoded data from the transport stream received;

a first outputting step of outputting the first encoded data extracted in the first extracting step;

a second extracting step of extracting second encoded data from the transport stream received;

a decoding step of decoding the second encoded data extracted in the second extracting step to thereby generate audio data; and a second outputting step of outputting the audio data generated in the decoding step. By doing in this manner, it becomes possible to process, for example, two kinds of music piece data simultaneously and independently.

The thirteenth invention is a medium for allowing a receiving equipment for receiving a transport stream obtained by multiplexing a plurality of encoded data encoded by different systems to execute a program comprising:

a first extracting step of extracting first encoded data from the transport stream received;

a first outputting step of outputting the first encoded data extracted in the first extracting step;

a second extracting step of extracting second encoded data from the transport stream received;

a decoding step of decoding the second encoded data extracted in the second extracting step to thereby generate audio data; and a second outputting step of outputting the audio data generated in the decoding step. By doing in this manner, it becomes possible to process, for example, two kinds of music piece data simultaneously and independently.

The fourteenth invention is receiving equipment for receiving a transport stream obtained by repeatedly multiplexing a plurality of contents data, comprising:

reading means for reading predetermined information corresponding to the contents data from the transport stream;

receiving means for receiving designation of the contents data from the user;

determining means for determining order of extracting the plurality of contents data corresponding to the designation from the user received by the receiving means from the transport stream with reference to the predetermined information read by the reading means on the basis of a predetermined algorithm; and extracting means for extracting the plurality of contents data corresponding to the designation from the user received by the receiving means from the transport stream in accordance with the order determined by the determining means. By doing in this manner, since it is arranged such that the order of extracting the plurality of contents data is determined based on a predetermined algorithm by referring to the predetermined read-out information and the plurality of contents data corresponding to the designation from the user is extracted from the transport stream in accordance with the order, it becomes possible to improve efficiency with respect to time as well as download the music piece data of a larger amount within predetermined time.

The fifteenth invention is the receiving equipment, comprising:

display control means for controlling a display to the effect that the contents data unable to be extracted exists when there exists the contents data which cannot be extracted within predetermined time by the extracting means in the plurality of contents data corresponding to the designation by the user received by the receiving means in the case where the extracting means extracts from the transport stream the plurality of contents data corresponding to the designation by the user received by the receiving means in accordance with the order determined by the determining means. By doing in this manner, it becomes possible to ascertain details concerning the unloadable contents data from the display.

The sixteenth invention is a receiving method of receiving equipment for receiving a transport stream obtained by repeatedly multiplexing a plurality of contents data, comprising:

a reading step of reading predetermined information corresponding to the contents data from the transport stream;

a receiving step of receiving designation of the contents data from the user;

a determining step of determining order of extracting a plurality of contents data corresponding to the designation from the user received in the receiving step from the transport stream with reference to the predetermined information read in the reading step on the basis of a predetermined algorithm; and an extracting step of extracting the plurality of contents data corresponding to the designation from the user received in the receiving step from the transport stream in accordance with the order determined in the determining step. By doing in this manner, since it is arranged such that the order of extracting the plurality of contents data is determined based on a predetermined algorithm by referring to the predetermined read-out information and the plurality of contents data corresponding to the designation from the user is extracted from the transport stream in accordance with the order, it becomes possible to improve efficiency with respect to time as well as download the music piece data of a larger amount within predetermined time.

The seventeenth invention is a medium for allowing receiving equipment for receiving a transport stream obtained by repeatedly multiplexing a plurality of contents data to execute a program comprising:

a reading step of reading predetermined information corresponding to the contents data from the transport stream;

a receiving step of receiving designation of the contents data from the user;

a determining step of determining order of extracting a plurality of contents data corresponding to the designation from the user received in the receiving step from the transport stream with reference to the predetermined information read in the reading step on the basis of a predetermined algorithm; and an extracting step of extracting the plurality of contents data corresponding to the designation from the user received in the receiving step from the transport stream in accordance with the order determined in the determining step. By doing in this manner, since it is arranged such that the order of extracting the plurality of contents data is determined based on a predetermined algorithm by referring to the predetermined read-out information and the plurality of contents data corresponding to the designation from the user is extracted from the transport stream in accordance with the order, it becomes possible to improve efficiency with respect to time as well as download the music piece data of a larger amount within predetermined time.

The eighteenth invention is broadcasting equipment for multiplexing downloadable contents data onto a main broadcast signal, comprising:

test-listening time setting means for setting test-listening time for the contents data;

the test-listening number of times setting means for setting the number of test-listening times of the contents data;

generating means for generating program information including the test-listening time and the number of test-listening times; and multiplexing means for multiplexing the program information generated by the generating means, the main broadcast signal, and the contents data to thereby generate a transport stream. By doing in this manner, since it is arranged such that the test-listening time and test-listening times corresponding to the contents data are set and the program information including them is multiplexed onto the main broadcasting signal and contents data to thereby generate the transport stream, it becomes possible to distribute the contents data capable of test-listening before the music piece data is purchased.

The nineteenth invention is the broadcasting equipment, wherein the contents data includes audio data encoded by an ATRAC system or audio data encoded by an MPEG2 system. By doing in this manner, it becomes possible to test-listen the music piece data transmitted as audio data encoded by the ATRAC system or audio data encoded by the MPEG 2 system before the audio data is purchased.

The twentieth invention is broadcasting method of broadcasting equipment for multiplexing downloadable contents data onto a main broadcast signal and broadcasting resultant data, comprising:

a test-listening time setting step of setting test-listening time for the contents data;

a test-listening number of times setting step of setting the number of test-listening times of the contents data;

a generating step of generating program information including the test-listening time and the number of test-listening times; and a multiplexing step of multiplexing the program information generated in the generating step, the main broadcast signal, and the contents data to thereby generate a transport stream. By doing in this manner, since it is arranged such that the test-listening time and test-listening times corresponding to the contents data are set and the program information including them is multiplexed onto the main broadcasting signal and contents data to thereby generate the transport stream, it becomes possible to distribute the contents data capable of test-listening before the music piece data is purchased.

The twenty-first invention is a medium for allowing broadcasting equipment for multiplexing downloadable contents data onto a main broadcast signal and broadcasting resultant data to execute a program comprising:

a test-listening time setting step of setting test-listening time for the contents data;

a test-listening number of times setting step of setting the number of test-listening times of the contents data;

a generating step of generating program information including the test-listening time and the number of test-listening times; and a multiplexing step of multiplexing the program information generated in the generating step, the main broadcast signal, and the contents data to thereby generate a transport stream. By doing in this manner, since it is arranged such that the test-listening time and test-listening times corresponding to the contents data are set and the program information including them is multiplexed onto the main broadcasting signal and contents data to thereby generate the transport stream, it becomes possible to distribute the contents data capable of test-listening before the music piece data is purchased.

The twenty-second invention is receiving equipment for receiving a transport stream obtained by multiplexing downloadable contents data together with program information onto a main broadcast signal, comprising:

separating means for separating the contents data from the transport stream;

extracting means for extracting the program information corresponding to the contents data separated by the separating means from the transport stream;

reproducing means for reproducing the contents data separated by the separating means; and regulating means for regulating a reproducing process of the reproducing means in accordance with the test-listening time and the number of test-listening times included in the program information extracted by the extracting means. By doing in this manner, the contents data and the program information is extracted from the transport stream, and the reproduction of the contents data is regulated in accordance with the test-listening time and the number of test-listening times included in the extracted program information. Consequently, the music piece data can be test-listened before purchasing it.

The twenty-third invention is the receiving equipment, wherein the contents data includes audio data encoded by the ATRAC system or audio data encoded by the MPEG2 system. By doing in this manner, it becomes possible to test-listen the music piece data transmitted as audio data encoded by the ATRAC system or audio data encoded by the MPEG 2 system before it is purchased.

The twenty-fourth invention is a receiving method of receiving equipment for receiving a transport stream obtained by multiplexing downloadable contents data together with program information onto a main broadcast signal, comprising:

a separating step of separating the contents data from the transport stream;

an extracting step of extracting the program information corresponding to the contents data separated in the separating step from the transport stream;

a reproducing step of reproducing the contents data separated in the separating step; and a regulating step of regulating a reproducing process of the reproducing means in accordance with the test-listening time and the number of test-listening times included in the program information extracted in the extracting step. By doing in this manner, the contents data and the program information is extracted from the transport stream, and the reproduction of the contents data is regulated in accordance with the test-listening time and the number of test-listening times included in the extracted program information. Consequently, the music piece data can be test-listened before purchasing it.

The twenty-fifth invention is medium for allowing receiving equipment for receiving a transport stream obtained by multiplexing downloadable contents data together with program information onto a main broadcast signal to execute a program characterized by comprising:

a separating step of separating the contents data from the transport stream;

an extracting step of extracting the program information of the contents data separated in the separating step from the transport stream;

a reproducing step of reproducing the contents data separated in the separating step; and a regulating step of regulating a reproducing process of the reproducing means in accordance with the test-listening time and the number of test-listening times included in the program information extracted in the extracting step. By doing in this manner, the contents data and the program information is extracted from the transport stream, and the reproduction of the contents data is regulated in accordance with the test-listening time and the number of test-listening times included in the extracted program information. Consequently, the music piece data can be test-listened before purchasing it.

BRIEF DESCRIPTION OF THE DRAWINGS

FIG. 4 is a diagram for explaining purchase limit time of the music piece data for downloading.

FIG. 5 is a diagram for explaining a TS packet in which ATRAC data is placed.

FIG. 9 is a diagram for explaining an ATRAC data checksum in the TS packet.

BEST MODE FOR CARRYING OUT THE INVENTION

Figure 1:
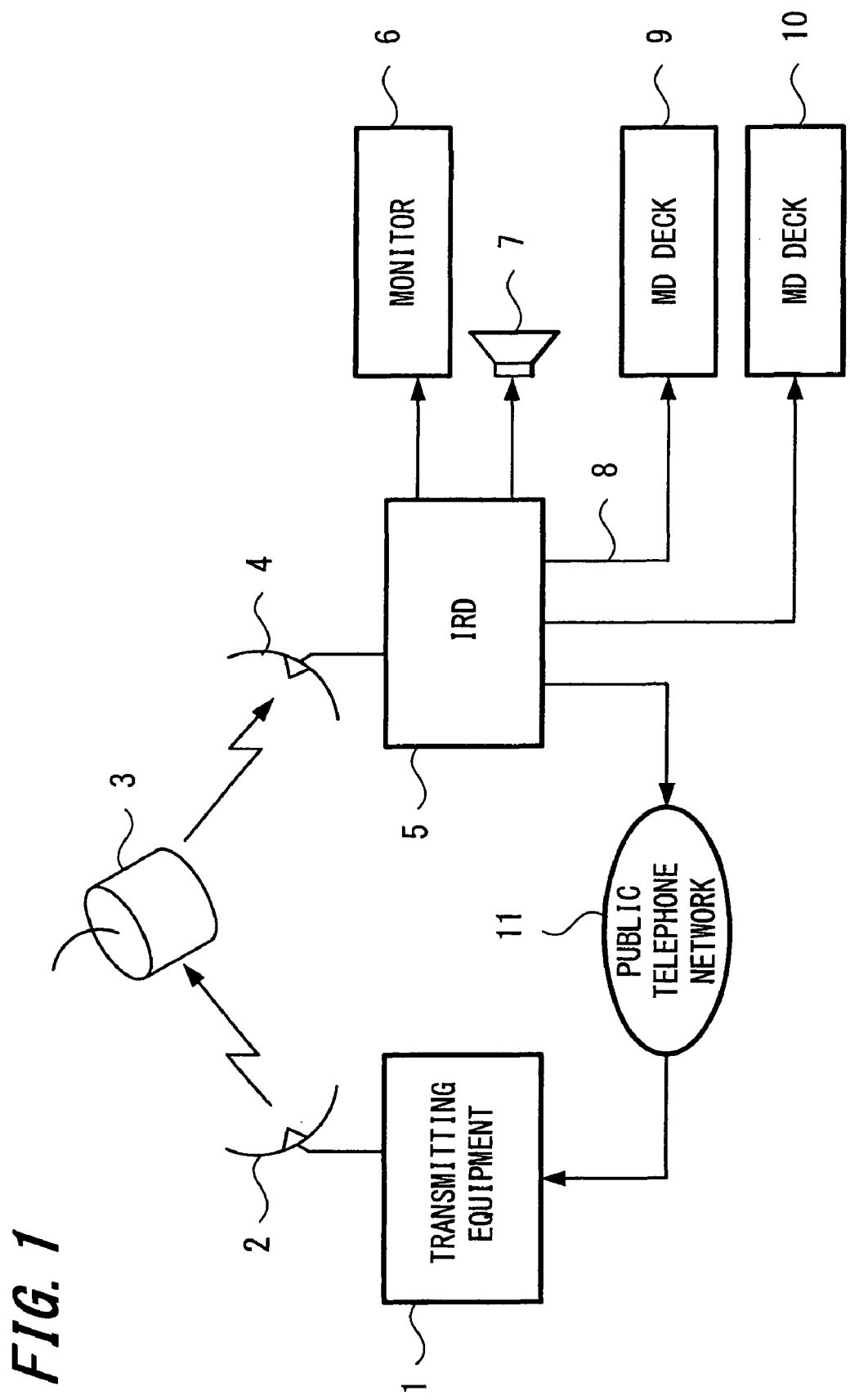
FIG. 1 is a block diagram showing an example of the configuration of an EMD system to which the invention is applied.

FIG. 1 shows a configuration example of an embodiment of an EMD (Electric Music Distribution) system to which the invention is applied. In the EMD system, a transmitting equipment 1 on the broadcast station side multiplexes, for example, main broadcast signals (a video signal and a sound signal compression coded by the MPEG2 system) of a music program, music piece data (MPEG audio data and ATRAC data) for downloading a music piece related to the music program, and the like, scrambles a resultant signal, executes necessary processes such as error correction of the scrambled signal, performs, for example, QPSK (Quadrature Phase Shift Keying) modulation of an MPEG transport stream obtained (hereinbelow, described as TS), and transmits a resultant signal as an electric wave from an antenna 2.

The electric wave transmitted from the antenna 2 is relayed by a communication satellite 3, received by an antenna 4, and supplied to an IRD 5. The IRD 5 QPSK demodulates the electric wave received by the antenna 4, performs necessary processes such as error correction, extracts a TS packet of a channel selected by the user, and descrambles the data. The IRD 5 MPEG decodes the main broadcast signal included in the extracted TS packet, outputs an obtained video signal to a monitor 6, and outputs the sound signal to a speaker 7.

The IRD 5 extracts the TS packet including the music piece data (ATRAC data) for downloading and supplies the TS packet to an MD deck 9 connected to the IRD 5 via an IEEE1394 bus 8. Further, the IRD 5 MPEG decodes the music piece data (MPEG audio data) for downloading and outputs resultant data to the speaker 7 or an MD deck 10 connected to a sound output terminal.

The IRD 5 records a download history of music piece data into a built-in IC card 40 (FIG. 10) and periodically transmits the download history information to the transmitting equipment 1 via a public telephone network 11. The download history information transmitted to the transmitting equipment 1 is used as information for charging the user of the IRD 5.

The MD deck 9 records the music piece data (ATRAC data) supplied from the IRD 5 via the IEEE1394 bus 8 onto an MD and reproduces the data. The MD deck 10 encodes the music piece data (audio data obtained by decoding the MPEG audio data) supplied from the IRD 5 in accordance with the ATRAC system, records the encoded data onto an MD, and reproduces the data.

Figure 2:
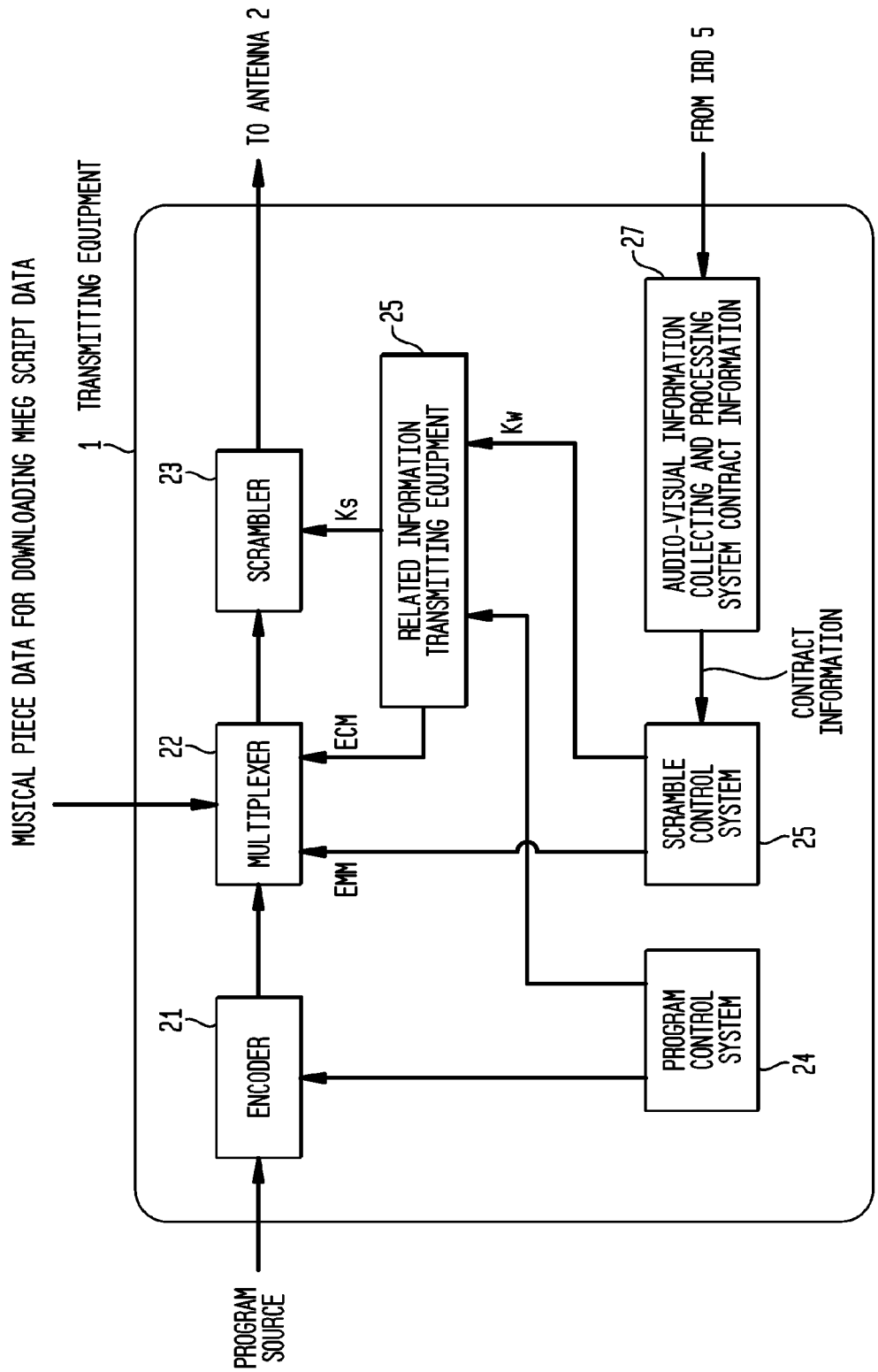
FIG. 2 is a block diagram showing an example of the configuration of a transmitting equipment 1 in FIG. 1.

FIG. 2 shows an example of a detailed configuration of the transmitting equipment 1. An encoder 21 in the transmitting equipment 1 compression encodes a program source (the video signal and the sound signal as main broadcast signals) in accordance with the MPEG2 system and outputs the resultant to a multiplexer 22. The multiplexer 22 time-division multiplexes the main broadcast signal from the encoder 21, individual information EMM (Entitlement Management Message) supplied from a scramble control system 25, program information ECM (Entitlement Control Message) supplied from a related information transmitting equipment 26, music piece data for downloading (ATRAC data and MPEG audio data), sound additional information corresponding to the music piece data, an MHEG (Multimedia and Hypermedia Information Coding Experts Group) script realizing an interactive GUI (Graphical User Interface) used at the time of selecting a music piece to be downloaded on the reception side, and additional information tables (PSI: Program Specific Information) indicating a TS packet in a TS, in which the main broadcast signal, music piece data for downloading, and the like are included, thereby generating a TS in the MPEG2 system. The generated TS is supplied to a scrambler 23.

Since the music piece data for downloading includes ATRAC data (which will be described hereinlater) which does not match the TS in the MPEG2 system, some contrivance is necessary at the time of multiplexing (the details will be described hereinlater).

The additional information tables PSI are a PAT (Program Association Table), a PMT (Program Map Table), an SIT (Selection Information Table), and the like. By sequentially referring to the tables, the packet ID of the TS packet including the desired data can be known. The details are described in, for example, ETS 300468, Digital Video Broadcasting (DVB); Specification for Service Information (SI) in DVB system.

Figure 3:
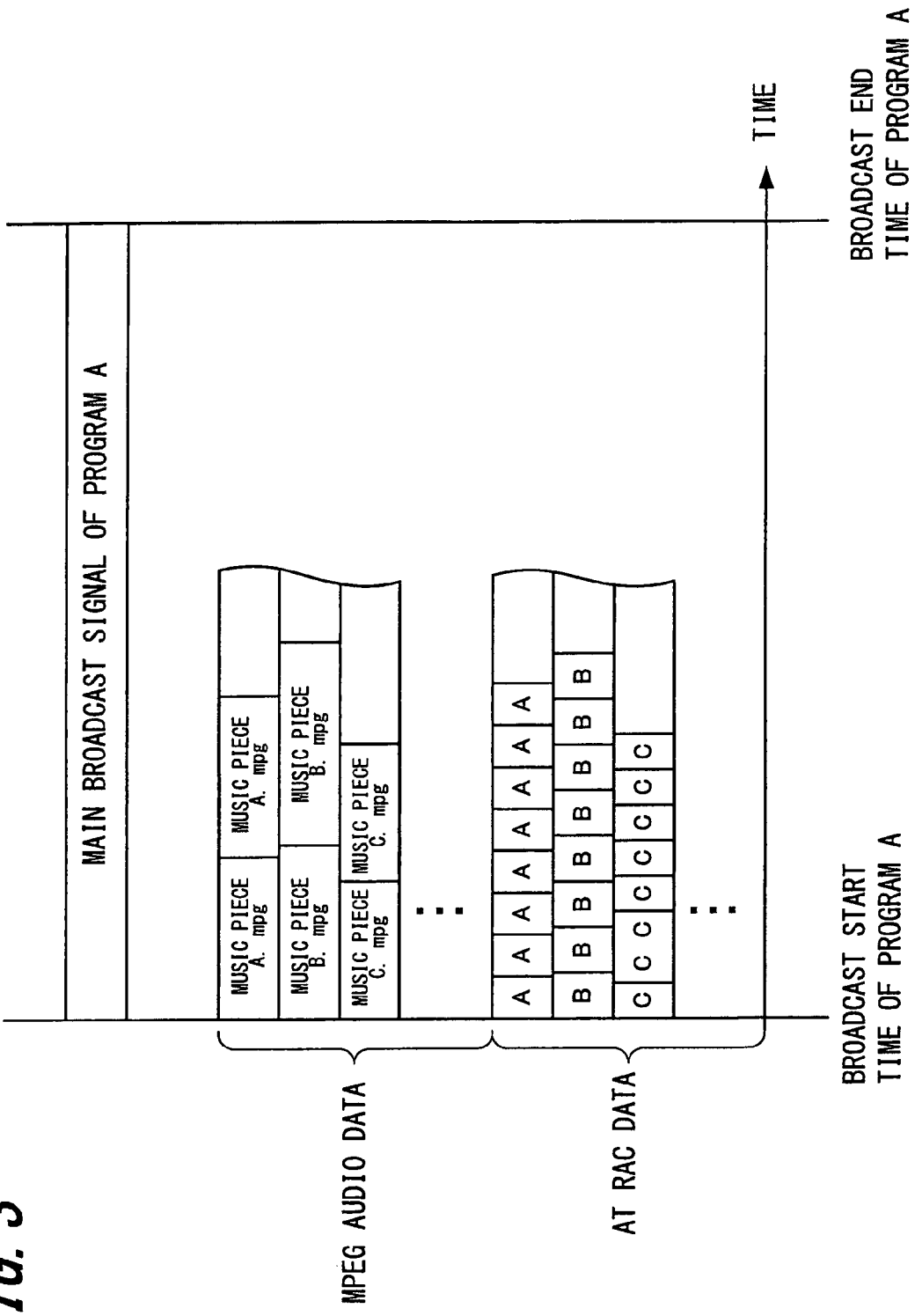
FIG. 3 is a diagram for explaining the type of music piece data for downloading.

The music piece data for downloading will now be described with reference to FIG. 3. As shown in FIG. 3, for example, music piece data for downloading to be multiplexed on the main broadcast signal of a program A is data on a plurality of musical pieces A, B, and C related to the program A and has two kinds of data for each musical piece; MPEG audio data compression coded by the MPEG2 system and ATRAC data compression coded by the ATRAC system. The MPEG audio data and the ATRAC data of each music piece is repeatedly transmitted during the broadcasting time of the program A.

Time required to transmit MPEG audio data once is equal to time (play time) to reproduce the MPEG audio data. Time required to transmit ATRAC data once is equal to a quarter of time required to reproduce the ATRAC data.

For example, when broadcasting time of the program A is one hour and the play time of the music pieceA is eight minutes, the time to transmit MPEG audio data (music pieceA.mpg) of the music pieceA once is also eight minutes. The MPEG audio data on the music pieceA is repeatedly transmitted seven times (=60/8) at the maximum during the broadcasting time of the program A. On the other hand, the time required to transmit the ATRAC data on the music pieceA once is 2 (=8/4) minutes, and the ATRAC data on the music pieceA is repeatedly transmitted 30 (=60/2) times at the maximum. When play time of the music pieceB is nine minutes, time required to transmit MPEG audio data on the music pieceB (music pieceB.mpg) is also nine minutes, and MPEG audio data on the music pieceB is repeatedly transmitted six (=60/9) times at the maximum during the broadcasting time of the program A. On the other hand, time required to transmit the ATRAC data on the music pieceB once is 2.25 (=9/4) minutes. During the broadcasting time of the program A, the ATRAC data on the music pieceB is repeatedly transmitted 26 (=60/2.25) times at the maximum.

Referring to FIG. 2 again, the scrambler 23 scrambles the TS supplied from the multiplexer 22 by using a scramble key (Ks) supplied from the related information transmitting equipment 26 and outputs the resultant to the post stage. A program control system 24 generates a predetermined control signal to control the encoder 1. The program control system 24 outputs information such as a program ID, a channel ID, and the like on the program corresponding to the main broadcast signal to be compression coded by the encoder 21 to the related information transmitting equipment 26. The scramble control system 25 supplies a contract key (Kw) to the related information transmitting equipment 26, generates the individual information EMM including the contract key encrypted by using an individual key peculiar to the IRD 5, and outputs the individual information EMM to the multiplexer 22.

The individual information EMM to be generated has items such as card ID, contract key number (Kw_no), contract key (Kw), contract channel ID (service_id, series_id), contract number ID (event_id), contract type (authorize_type), program purchase upper limit (Over_view), SMS call generation date (polling_date), and SMS call generation amount (upkink_fee). The details of the items will be described hereinlater as appropriate.

The related information transmitting equipment 26 supplies a scramble key to the scrambler 23. The related information transmitting equipment 26 also generates program information ECM including the scramble key encoded by using the contract key supplied from the scramble control system 25 and outputs the program information ECM to the multiplexer 22.

The program information ECM to be generated has items such as the contract key number (Kw_no), encoded scramble key (Ks_Odd, Ks_Even), channel ID (service_id, series_id, event_id), number ID (event_id), pay-per-view fee (PPV_fee), preview (viewing) time, the limit number of previewing (viewing) times, current time, and purchase limit time. The details of the items will be described hereinlater as appropriate.

An audio-visual information collecting and processing system 27 processes audio-visual history information and the like supplied from the IRD 5 via the public telephone line 11 and outputs processed information as contract information to the scramble control system 25.

The viewing time and the limit number of viewing times of each of the music piece data included in the program information ECM will now be described. In the embodiment, each of the music piece data can be viewed within the range described as the viewing time and the limit number of viewing times included in the program information ECM. As the viewing time set for the music piece data, time shorter than the whole play time of the music piece and long enough to select the music piece is set. The limit number of viewing times is set to a value larger than one so that a plurality of music piece data can be repeatedly compared with each other. The viewing time and the limit number of viewing times of music piece data can be set so as to vary according to music piece data.

The purchase limit time of each music piece data included in the program information ECM will now be described with reference to FIG. 4. As described above, the music piece data for downloading (MPEG audio data and ATRAC data) of each music piece is repeatedly transmitted during the broadcasting time of the program. In the example shown in FIG. 4, during the broadcasting time of the program A, the music piece data for downloading of the music pieceA is repeatedly transmitted 15 times, the music piece data for downloading of the music pieceB is repeatedly transmitted 13 times, and the music piece data for downloading of the music pieceC is repeatedly transmitted 11 times.

In the case where, for example, the viewer instructs the IRD 5 to purchase the music pieceC at timing to during the sixth transmission of the music piece data, the music piece data to be transmitted for the seventh time immediately after the instruction is usually downloaded. When the downloading of the music piece data transmitted for the seventh time fails for some reason, downloading is re-executed with respect to the music piece data to be transmitted for the eighth time. The final transmission time of the music piece data on each of the musical pieces is used for re-execution. Timing at which downloading of the music piece data transmitted immediately preceding to the final time is set as purchase limit time by using elapsed time since the program start time. Specifically, as shown in FIG. 4, the purchase limit time of the musical pieces A, B, and C are set at timings t1, t2, and t3, respectively. By setting the purchase limit time as described above, occurrence of a situation such that downloading cannot be performed in spite of an instruction of purchase can be suppressed.

A process of multiplexing the ATRAC data into the TS in the MPEG2 system will now be described. The TS packet as a transmission unit of a TS in the MPEG2 system is set to have a fixed length of 188 bytes. On the other hand, a sound group as a transmission unit of the ATRAC data has 424 bytes. When the ATRAC data is used as it is as a TS in the MPEG2 system, the match is poor.

In the embodiment, as shown in FIG. 5(a), ATRAC data of 159 bytes is arranged in a TS packet, and a PES (Packetized Elementary Stream) packet is constructed by eight TS packets TSP1 to TSP8. One PES packet therefore includes ATRAC data of 1272 (=159×8) bytes. Since the ATRAC data of 1272 bytes corresponds to, as shown in FIG. 5(b), three sound groups as transmission units of the ATRAC data, three sound groups can be transmitted by one PES packet. When an integer number of sound groups are transmitted by one PES packet, the match between the ATRAC data and the TS in the MPEG2 system is good.

Figure 6:
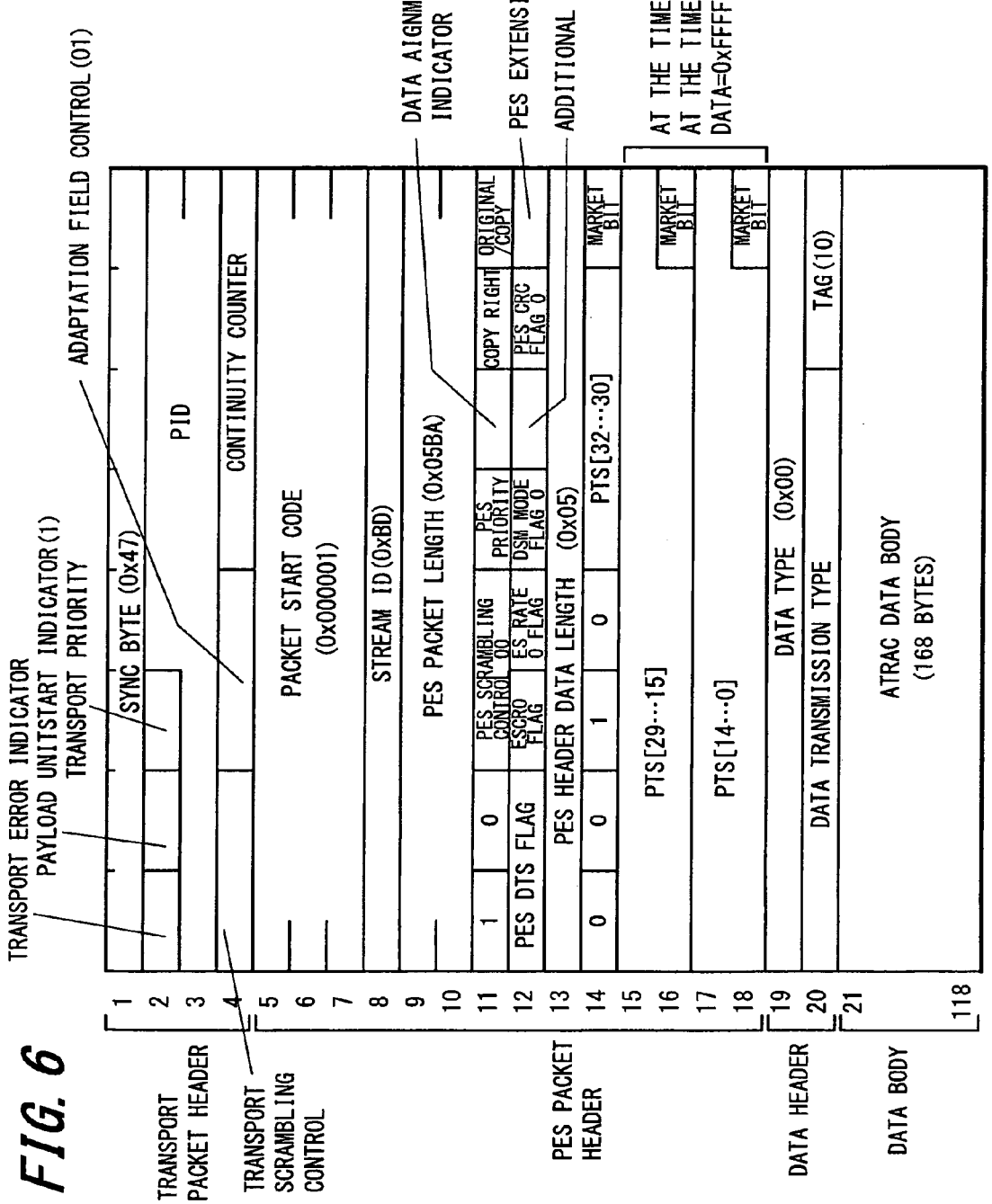
FIG. 6 is a diagram for explaining the TS packet in which ATRAC data is placed.

FIG. 6 shows the configuration of the TS packet in which the ATRAC data is arranged. As shown in the diagram, four bytes from the head of the TS packet made up of 188 bytes are set as a TS packet header, the following 14 bytes are set as a PES packet header, the following two bytes are set as a data header, and the remaining 168 bytes are set as a data body.

In the TS packet header, sequentially from the head, one sync byte, a TS error indicator in which a flag indicative of presence/absence of an error in the TS packet is written, a payload unit start indicator in which a flag indicating that a new PES packet starts from the payload of the TS packet is written, and TS priority indicative of the degree of importance of the TS packet are arranged. Subsequently, stream identification information (PID) of 13 bits indicative of the attribute of an individual stream of the TS packet, TS scrambling control indicative of the presence/absence and kind of scrambling on the payload of the packet, adaptation field control indicative of the presence/absence of an adaptation field, and continuity counter indicative of a serial number given to a packet having the same PID are arranged.

In the TS packet header, sequentially from the head, packet start code prefix of a fixed value of three bytes, stream ID of one byte for identifying the stream, and PES packet length of two bytes indicative of the length of the PES packet are arranged. Subsequently, fixed pattern "10" of two bits, PES scrambling control of two bits, PES priority of one bit, data alignment indicator of one bit, copy right of one bit, discrimination between original and copy of one bit, PTS and DTS flags of two bits, ESCR flag of one bit, ES rate flag of one bit, DMS trick mode flag of one bit, additional copy information flag of one bit, CRC flag of PES of one bit, and PES extension flag of one bit are arranged.

Further, PES header data length of one byte, fixed pattern "1101" of four bits, time stamp (PTS 32 to PTS 30) of three bits, one market bit, time stamp (PTS 29 to PTS 15) of 15 bits, one market bit, time stamp (PTS 14 to PTS 0) of 15 bits, and one market bit are arranged.

In the data header, sequentially from its head, data type of one byte, data transmission type of six bits, and tag of two bits are arranged.

Figure 7:
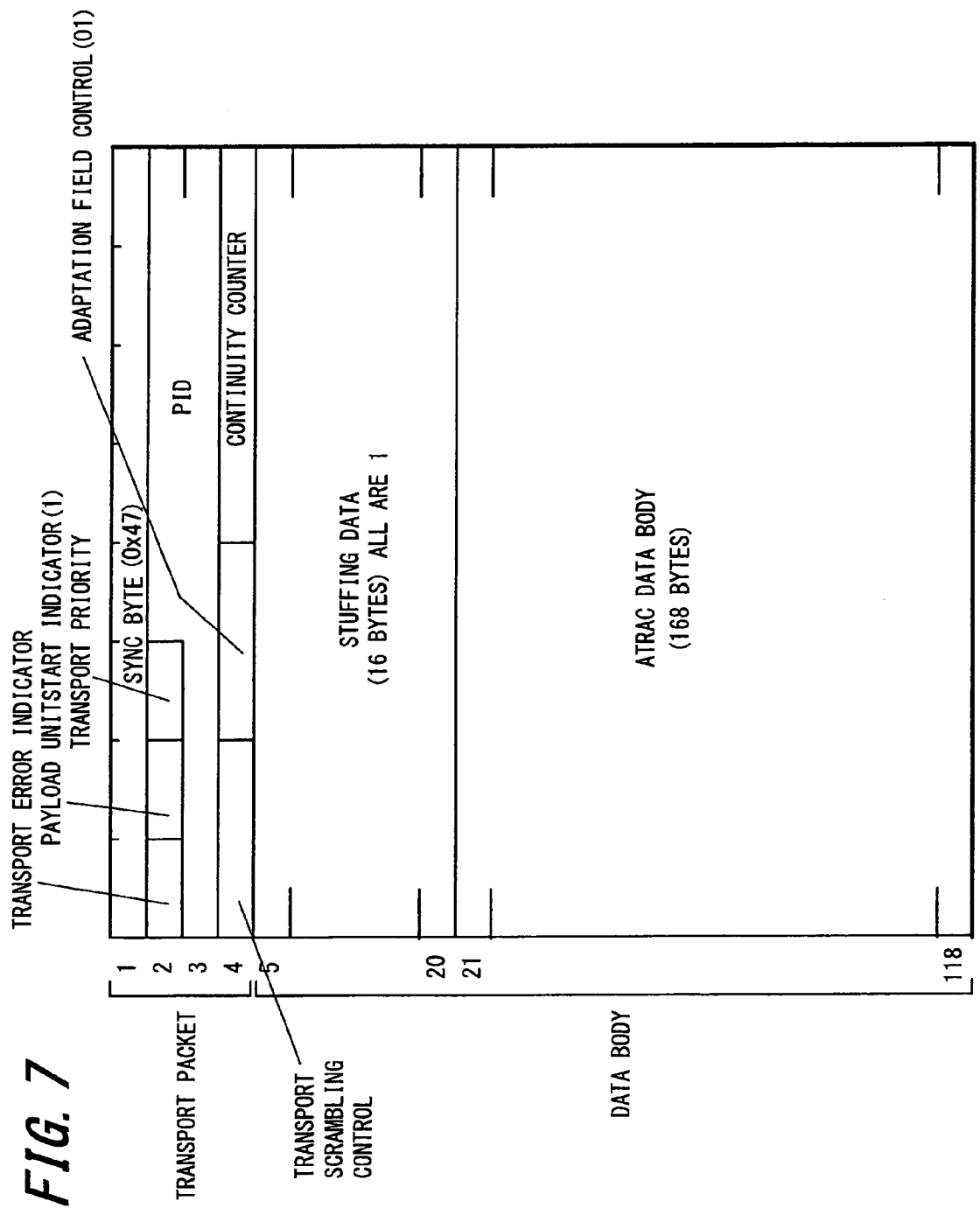
FIG. 7 is a diagram for explaining the TS packet in which ATRAC data is placed.

The TS packet shown in FIG. 6 is the first one of eight TS packets constructing the PES packet. In each of the second to eighth TS packets among the eight TS packets, in place of the PES packet header and the data header existing in the first TS packet (FIG. 6), as shown in FIG. 7, stuffing data is disposed.

Figure 8:
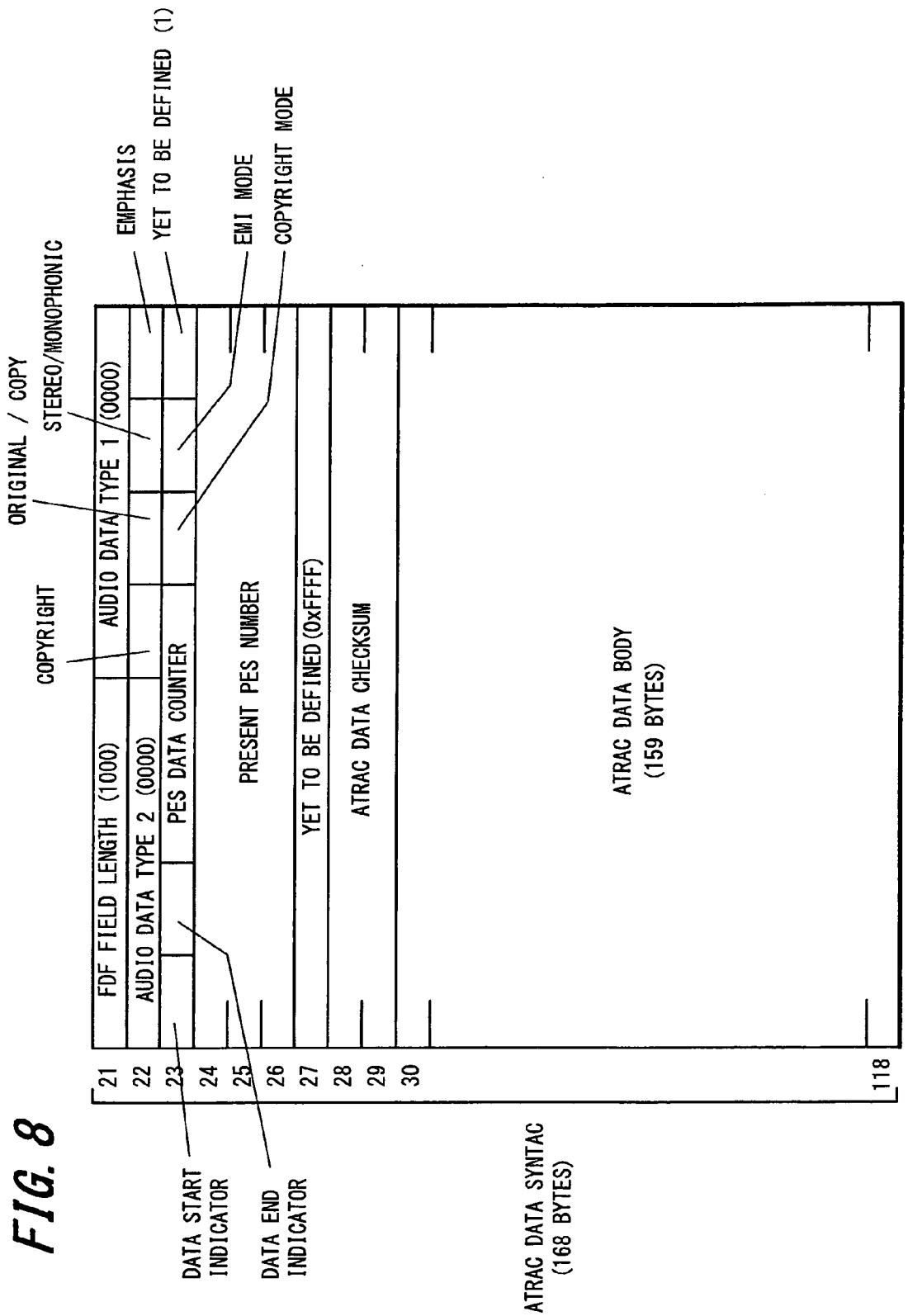
FIG. 8 is a diagram for explaining the TS packet in which ATRAC data is placed.

In the data body in which the ATRAC data is arranged, as shown in FIG. 8, sequentially from the head (the 21st byte of the TS packet), FDF field length of four bits indicative of length of an FDF (Field Dependent Field) and audio data types 1 and 2 each of four bits are arranged. Audio data type 1 is to define the audio type (for example, ATRAC). Audio data type 2 is to define the classification (for example, ATRAC1 or ATRAC2) in the data type 1. Subsequently, copy-right, original/copy (flag corresponding to CGMS (Copy Generation Management System)), discrimination between stereo and monophonic, emphasis information, data start indicator, data end indicator, and PES data counter of three bits are arranged.

The data start indicator is a flag indicating that the TS packet is the head of the music piece data. In the data start indicator of the TS packet as the head of the music piece data, "1" is written. The data end indicator is a flag indicating that the TS packet is at the end of the music piece data. In the data end indicator of the TS packet as the end of the music piece data, "1" is written. The PES data counter is to indicate the position of the TS packet among the eight TS packets constructing the PES packet.

Further, subsequently, identification of copyright mode of one bit, identification of EMI (Encryption Mode Information) of one bit, one reserved bit, present PES number of three bytes, reserved two bytes, and ATRAC data checksum of one byte are arranged. After that, the ATRAC data is placed.

The present PES number indicates the PES packet having the TS packet among a plurality of PES packets constructing the musical piece. Consequently, by detecting the present PES numbers and the PES data counters of the TS packets sequentially transmitted, continuity of the TSs on the TS packet unit basis can be checked.

In the 29th byte in the TS packet, the ATRAC data checksum is placed. The relation between the ATRAC data checksum and the ATRAC data body in the 30th and subsequent bytes will be described with reference to FIG. 9. As shown in FIG. 9, when the values of the bits of the ATRAC data checksum are CS[0] to CS[7] and the values of the bits of the ATRAC data body from the 30th byte to the 188th byte are AT[0][0] to AT[158][7], the values of CS[0] to CS[7] are set so that the following is obtained.

CS[0]^AT[0][0]^AT[1][0]^AT[2][0]^ . . . ^AT[158][0]=0
CS[1]^AT[0][1]^AT[1][1]^AT[2][1]^ . . . ^AT[158][1]=0
. . .
CS[7]^AT[0][7]^AT[1][7]^AT[2][7]^ . . . ^AT[158][7]=0
where ^ denotes exclusive OR operation.

As described above, by providing the checksum for the ATRAC data body, on the reception side of the TS packet, whether there is an error in the ATRAC data body or not can be determined.

Figure 10:
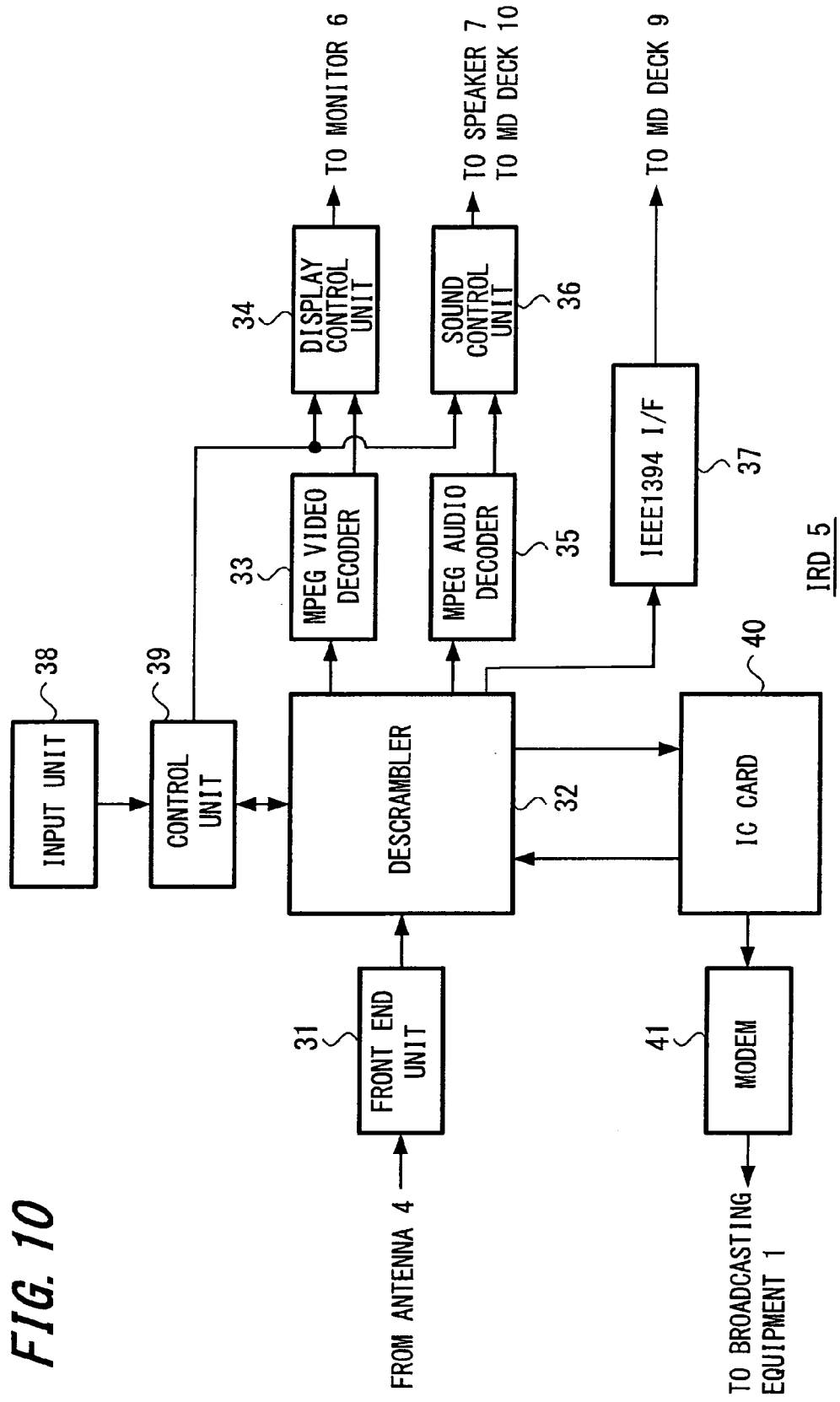
FIG. 10 is a block diagram showing an example of the configuration of the IRD 5 in FIG. 1.

FIG. 10 shows an example of the configuration of the IRD 5. A front end unit 31 in the IRD 5 selects a signal corresponding to a station selecting operation of the user from the broadcast signal received by the antenna 4, performs processes such as QPSK demodulation and error correction, and outputs a derived TS (which is scrambled) to a descrambler 32.

The descrambler 32 descrambles the scrambled TS supplied from the front end unit 31 by using an individual key and the like supplied from the IC card 40 into a TS packet including the main broadcast signals (MPEG video data and MPEG audio data), the MPEG audio data for downloading, the ATRAC data for downloading, the MHEG script for GUI, and the like which are multiplexed on the TS. Further, the descrambler 32 supplies the derived TS packet of the MPEG video data in the main broadcast signal to an MPEG video decoder 33, supplies the TS packet of the MPEG audio data in the main broadcast signal and the TS packet of the MPEG audio data for downloading to an MPEG audio decoder, supplies the TS packet of the ATRAC data for downloading to an IEEE1394 interface (I/F) 37, and supplies the TS packet of the MHEG script for GUI to a control unit 39.

The MPEG video decoder 33 decodes the MPEG video data supplied from the descrambler 32 and outputs derived video data to a display control unit 34. The display control unit 34, for example, superimposes the video data supplied from the MPEG video decoder 33 on a main program display area 51 (FIG. 12) of a GUI screen inputted from the control unit 39 and displays the composite data on the monitor 6.

The MPEG video decoder 35 decodes the MPEG audio data in the main broadcast signal or the MPEG audio data for downloading supplied from the descrambler 32 and outputs the derived audio data to a sound control unit 36. The sound control unit 36 performs an appropriate process such as fade-in and fade-out of the audio data supplied from the MPEG audio decoder 35 on the basis of the control from the control unit 39 and outputs resultant data to the speaker 7 or the MD deck 10.

The IEEE1394 interface 37 eliminates a PMT corresponding to a program other than the program from which the music piece can be purchased from PAT in the additional information table PSI multiplexed on the TS packet in which the ATRAC data inputted from the descrambler 32 is placed, eliminates PIDs corresponding to the main broadcast signal, MPEG audio data for downloading, and sound additional information from the PMT corresponding to the program, newly adds SIT indicative of a partial TS, and outputs an obtained partial TS to the MD deck 9 via the IEEE1394 bus 8.

An input unit 38 receives a station selecting operation of the user and an operation on the GUI screen (FIG. 12) and outputs the operation information to the control unit 39. The control unit 39 controls each of the units in the IRD 5 on the basis of the operation information from the input unit 38 and predetermined information inputted from the descrambler 32. For example, the control unit 39 processes the MHEG script for GUI inputted from the descrambler 32 and outputs the image data to the display control unit 34.

In the IC card 410, information such as an individual key for descrambling the TS packet is stored. In response to a request from the descrambler 32, the stored information is supplied to the descrambler 32. History information on watched pay-per-view programs and downloaded music piece data is recorded in the IC card 40. A modem 41 outputs the history information recorded on the IC card 40 to the transmitting equipment 1 via the public telephone network 11 every predetermined period.

Figure 11:
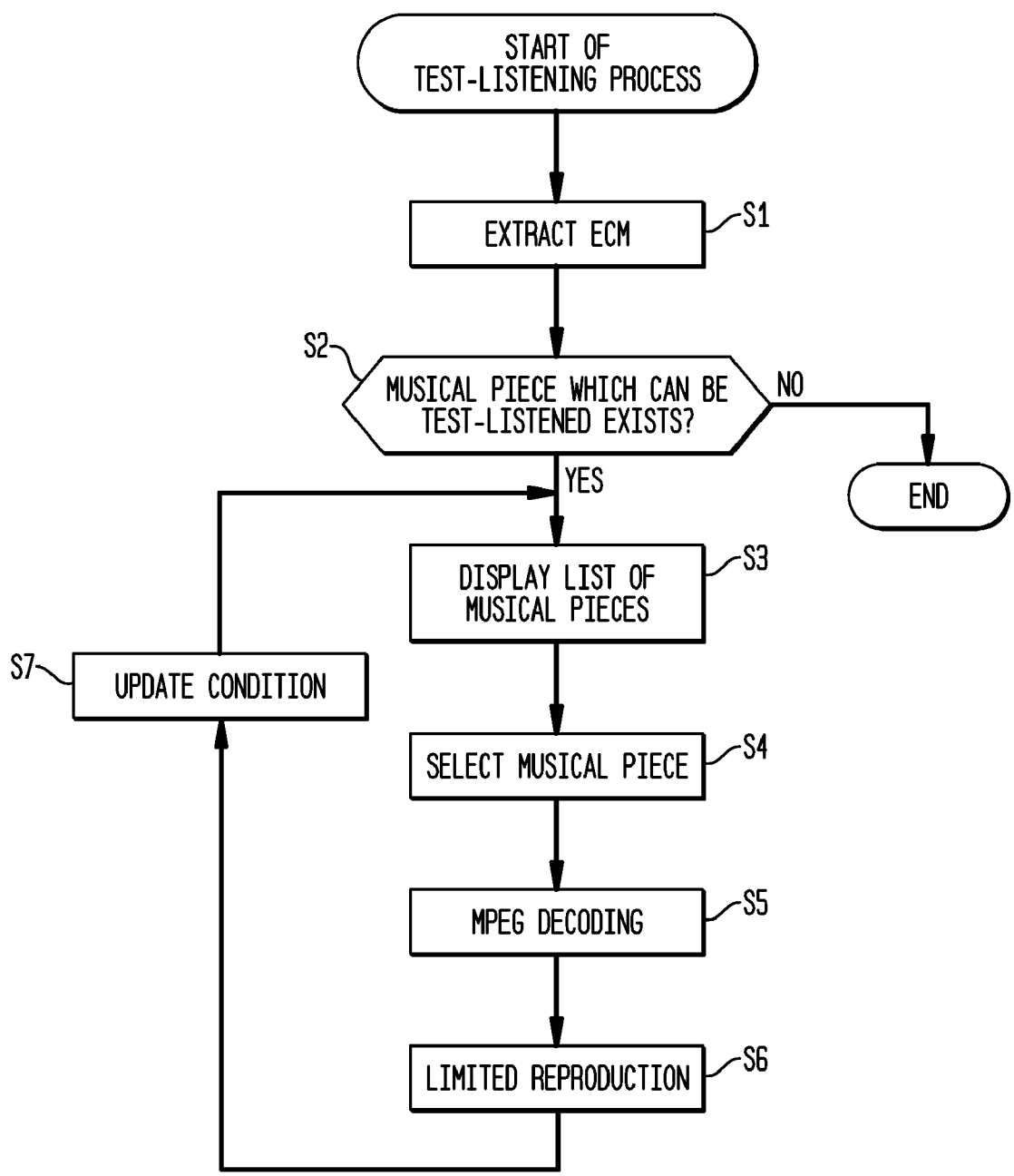
FIG. 11 is a flowchart for explaining a test-listening process of the IRD 5.

A test-listening process of the IRD 5 will now be described with reference to the flowchart of FIG. 11. The test-listening process is executed after the user (viewer) of the IRD 5 performs an operation of displaying a GUI for music piece purchase during test-listening a broadcast program from which the music piece data can be purchased (downloaded) and a GUI as shown in FIG. 12 is displayed on the monitor 6.

In step S1, the descrambler 32 extracts the program information ECM multiplexed on the TS and outputs viewing time, the limit number of test-listen times, and purchase limit time of each of music piece data written in the program information ECM to the control unit 39. In step S2, the control unit 39 compares the number of test-listen times with the limit number of test-listen times for each musical piece, thereby determining whether a music piece which can be test-listened exists or not. When it is determined that a music piece which can be test-listened exists, the program advances to step S3.

Figure 12:
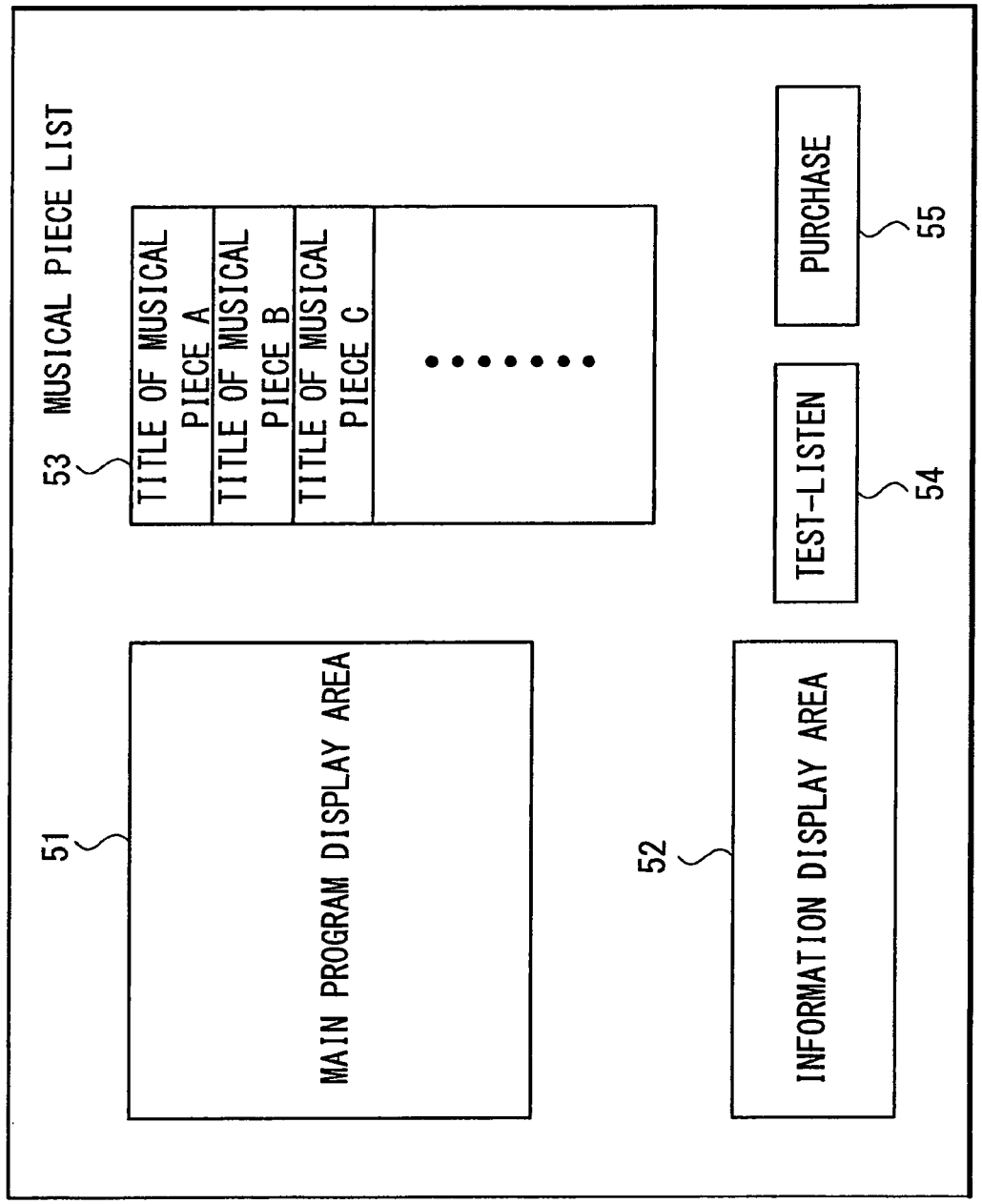
FIG. 12 is a diagram showing an example of the display of a GUI.

In step S3, the control unit 39 allows a music piece list 53 to be displayed on the screen of GUI as shown in FIG. 12. Among the titles of the musical pieces described in the music piece list 53, the display method of the titles of musical pieces which can be test-listened and purchased and that of the titles of musical pieces which cannot be test-listened (the number of test-listening times has reached the limit number of test-listening times) but can be purchased are distinguished from each other. For example, characters of the titles of the musical pieces which can be test-listened and purchased are displayed dark and characters of the titles of the musical pieces which cannot be test-listened but can be purchased are displayed light.

The user watching the music piece list 53 selects one of the musical pieces which are displayed in the music piece list 53 and can be test-listened and depresses a test-listen button 54, in step S4, selection information on the music piece to be test-listened is supplied from the input unit 38 to the control unit 39.

In step S5, the descrambler 32 outputs the MPEG audio data of the music piece selected in step S4 to the MPEG audio decoder 35 on the basis of the control from the control unit 39. The MPEG audio decoder 35 decodes the MPEG audio data from the descrambler 32 only for length of test-listen time written in the program information ECM on the basis of the control from the control unit 39 and outputs the obtained audio data to the sound control unit 36. In step S6, the sound control unit 36 makes the volume of the head portion of the audio data supplied from the MPEG audio decoder 35 fade in, makes the ending portion fade out, and outputs the resultant to the speaker 7.

In place of executing the fade-in and fade-out, sound indicative of test-listen may be inserted at the head and ending portions of the audio data. The sound quality of the audio data may be changed by using a filter or the like as long as the purpose of the test-listen can be achieved.

In step S7, the control unit 39 increments the number of test-listening times of the music piece selected in step S4 only by one.

After that, in step S2, until it is determined that a music piece which can be test-listened does not exist, subsequent processes are repeated. When it is determined that no music piece which can be test-listened exists, the test-listening process is finished.

As described above, by enabling each of the music piece data to be test-listened, it is advantageous for the audiences and also an effect of prompting purchase is produced. By limiting the number of test-listening times of each of the music piece data and executing fade-in, fade-out and the like on the audio data to be reproduced, it is suppressed that the music piece data is copied by connecting the test-listened audio data.

The purchasing process of the IRD 5 will now be described with reference to the flowchart of FIG. 13. The purchasing process is executed after the user performs an operation of displaying GUI for music piece purchase to the IRD 5 during test-listening of the program from which the music piece data can be purchased, and the GUI as shown in FIG. 12 is displayed on the monitor 6. The music piece data to be purchased is either the MPEG audio data or ATRAC data for downloading. The MPEG audio data or ATRAC data is selected by a predetermined operation performed by the user or is selected by the IRD 5 by detecting a sound output terminal of the IRD 5 or a recording equipment (MD deck 9 or the like) connected to the IEEE1394 interface 37.

In step S11, the program information ECM included in the TS is extracted and the viewing time, the limit number of test-listening times, and purchase limit time of each of music piece data written in the program information ECM are outputted from the descrambler 32 to the control unit 39. In step S12, the control unit 39 compares the current time with the purchase limit time for each musical piece, thereby determining whether a purchasable music piece exists or not. When it is determined that a purchasable music piece exists, the program advances to step S13.

In step S13, the control unit 39 allows the music piece list 53 to be displayed on the screen of the GUI as shown in FIG. 12. In the music piece list 53, the titles of musical pieces which can be test-listened and purchased and the titles of musical pieces which cannot be test-listened (the number of test-listening times has reached the limit number of test-listening times) but can be purchased are distinguished and, for example, the titles of musical pieces which can be test-listened and purchased are displayed dark and the titles of musical pieces which cannot be test-listened but can be purchased are displayed light.

In step S14, after the user sees the music piece list 53 and selects some of the purchasable musical pieces which are displayed in the music piece list 53, the control unit 39 determines whether a purchase button 55 is depressed or not. Until depression of the purchase button 55 is determined, the program returns to step S12 and subsequent processes are repeated. During the repetition, the display of the titles of musical pieces of which purchase limit time has elapsed is changed. When depression of the purchase button 55 is determined, the program advances to step S15.

Figure 14:
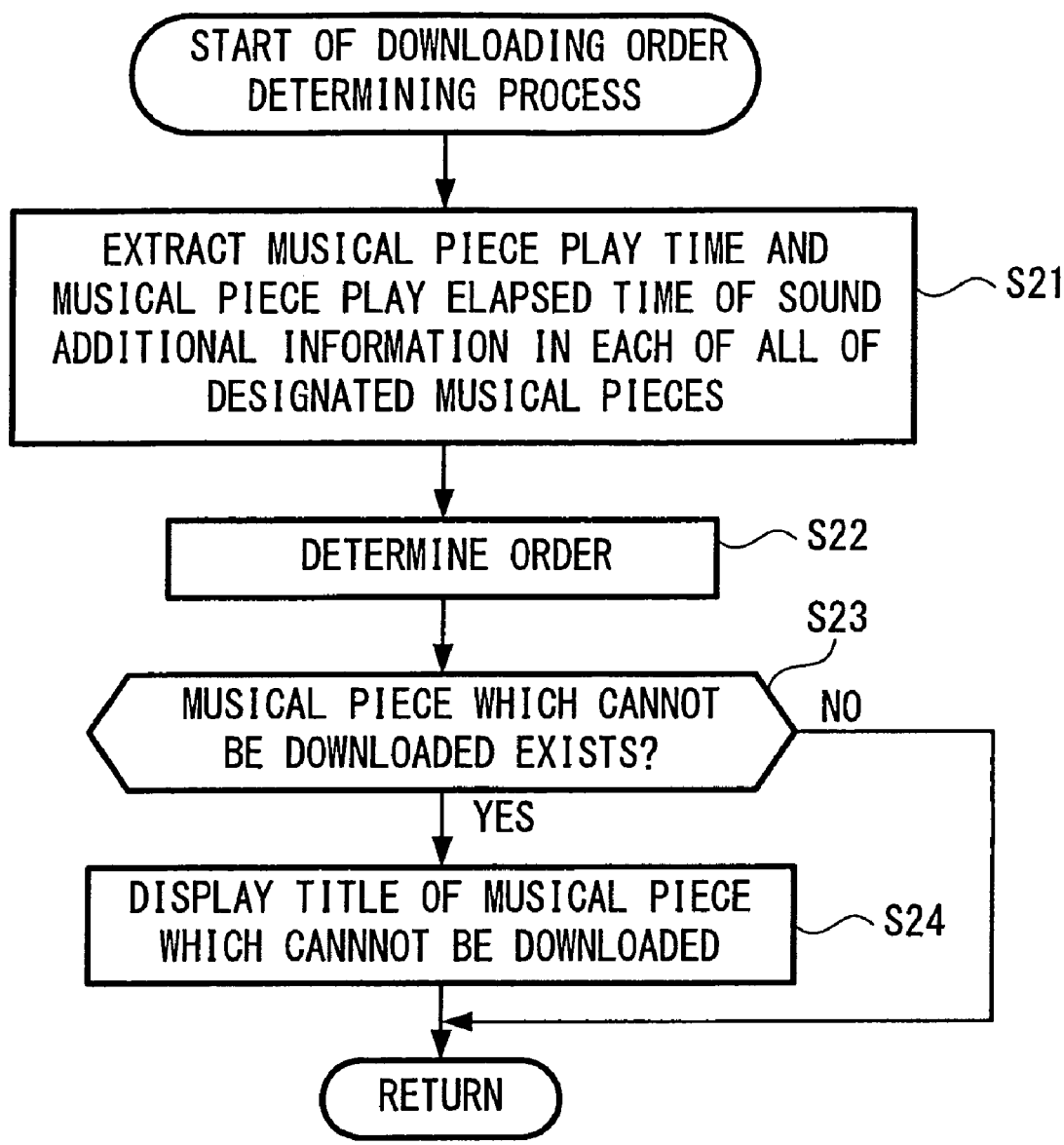
FIG. 14 is a flowchart for explaining a download order determining process of the IRD 5.

In step S15, the control unit 39 determines whether the purchase of a plurality of musical pieces has been instructed by the user in step S14 or not. When it is determined that the purchase of the plurality of musical pieces has been instructed, the program advances to step S16. In step S16, the control unit 39 determines the downloading order of the plurality of musical pieces to be purchased. The process of determining the downloading order will be described with reference to the flowchart of FIG. 14.

In step S21, the descrambler 32 extracts sound additional information at the present time (corresponding to play time and play elapsed time of a musical piece, and transmission time and transmission elapsed time of the MPEG audio data for downloading) corresponding to the plurality of music piece data instructed to be purchased by the control of the control unit 39 from the TS, and outputs the sound additional information to the control unit 39.

Figure 15:
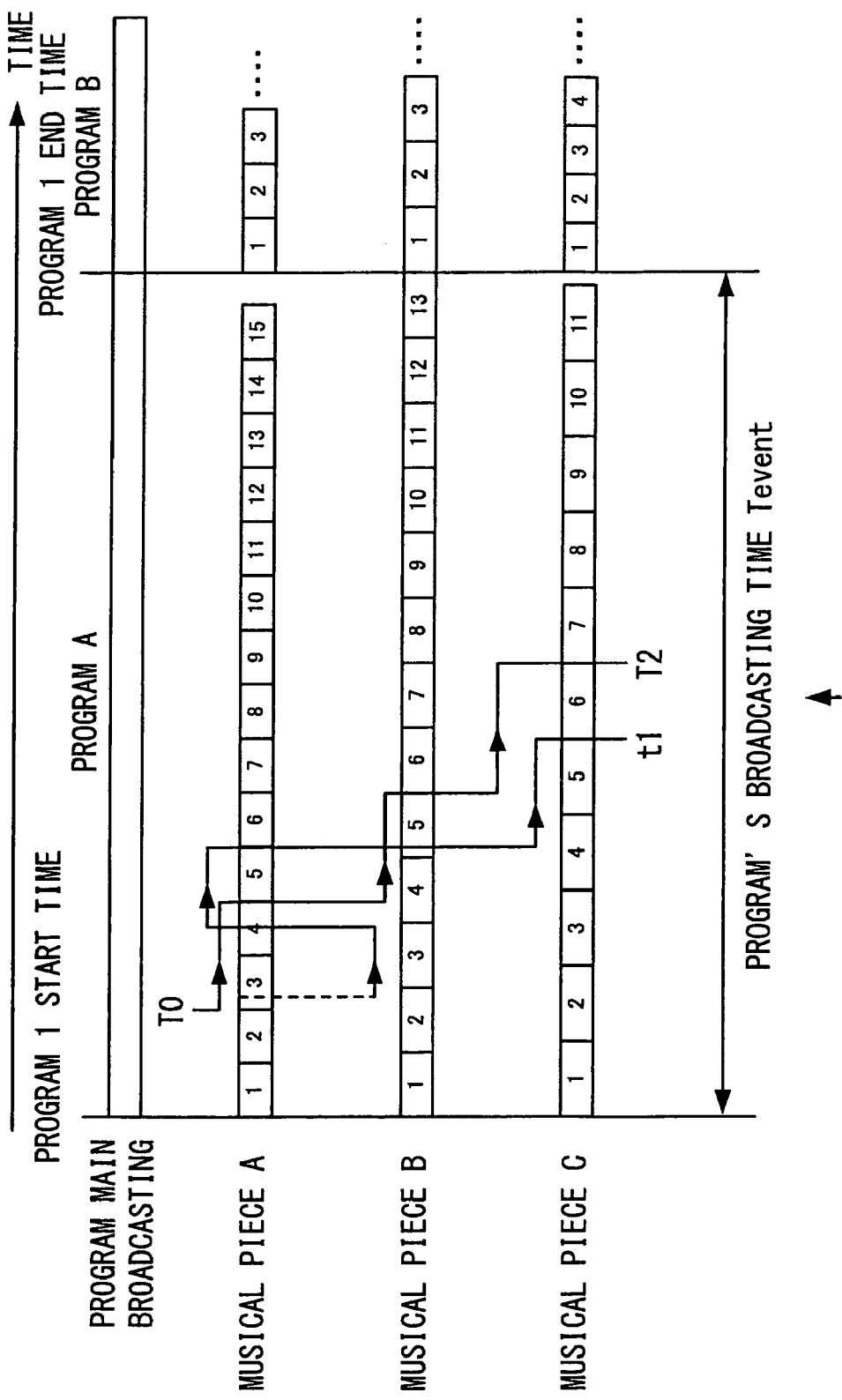
FIG. 15 is a diagram for explaining the download order determining process.

In step S22, the control unit 39 refers to the sound additional information from the descrambler 32 and optimizes the downloading order of the plurality of music piece data. For example, in the case of purchasing three musical pieces A, B, and C shown in FIG. 15, at time t0 where the purchase instruction is given, the music piece data of which timing of transmission start (music pieceB in this case) is the earliest in the three music piece data is set as music piece data to be downloaded first. At transmission end time of the first music piece data, the music piece data having the earlier transmission start timing (music pieceA in this case) in the music piece data on the remaining two musical pieces is set as music piece data to be downloaded second. The remaining piece (music pieceC in this case) is set as the music piece data to be downloaded third. In the case of optimizing the downloading order as described above, the end time is t1. On the contrary, in the case of downloading the musical pieces in accordance with the order of A, B, and C without optimizing the downloading order, the end time is t2 which is behind t1 by one musical piece.

Naturally, in the case of downloading music piece data on three or more musical pieces as well, the downloading order is optimized in a similar manner.

In step S23, the control unit 39 determines whether or not there is music piece data which cannot be downloaded due to the purchase limit time in the downloading order determined in step S22. When it is determined that the music piece data which cannot be downloaded exists, the program advances to step S24.

In step S24, the control unit 39 allows the message to the effect that the music piece data which cannot be downloaded exists and the title of the music piece to be displayed in an information display area 52 in the GUI. By the display, the user can know the music piece data which cannot be downloaded and can select another music piece data to be purchased as necessary.

When it is determined at step S23 that no music piece data which cannot be downloaded exists, the program skips step S24.

After executing the process of determining the downloading order as described above, the program returns to step S17 in FIG. 13. In step S17, the descrambler 32 extracts music piece data in accordance with the order determined in step S16 by the control of the control unit 39 and outputs the extracted music piece data to the post stage. In the case of downloading MPEG audio data for downloading, the MPEG audio data is MPEG decoded by the MPEG audio decoder 35 and, after that, decoded data is supplied to, for example, the MD deck 10 via the sound control unit 36 and the sound output terminal and is recorded. In the case where the ATRAC data is downloaded, the ATRAC data is supplied to the MD deck 9 via the IEEE1394 interface 37 and is recorded.

By executing the purchasing process including the download order determining process as described above, the music piece data of a larger amount can be efficiently downloaded.

The following manner is also possible. In step S11, when the control unit 39 detects the level of a received wave and the level is equal to or lower than a predetermined value, it is determined that no purchasable music piece exists.

It is also possible to store the order when a plurality of musical pieces are selected in step S14, skip the downloading order determining process in step S16, and perform downloading in accordance with the order at the time of the selection.

Even in the case where the music piece data is downloaded in the order which is not intended by the user, each of the MD decks 9 and 10 can reproduce the musical pieces in arbitrary order as a provided standardized function.

Figure 16:
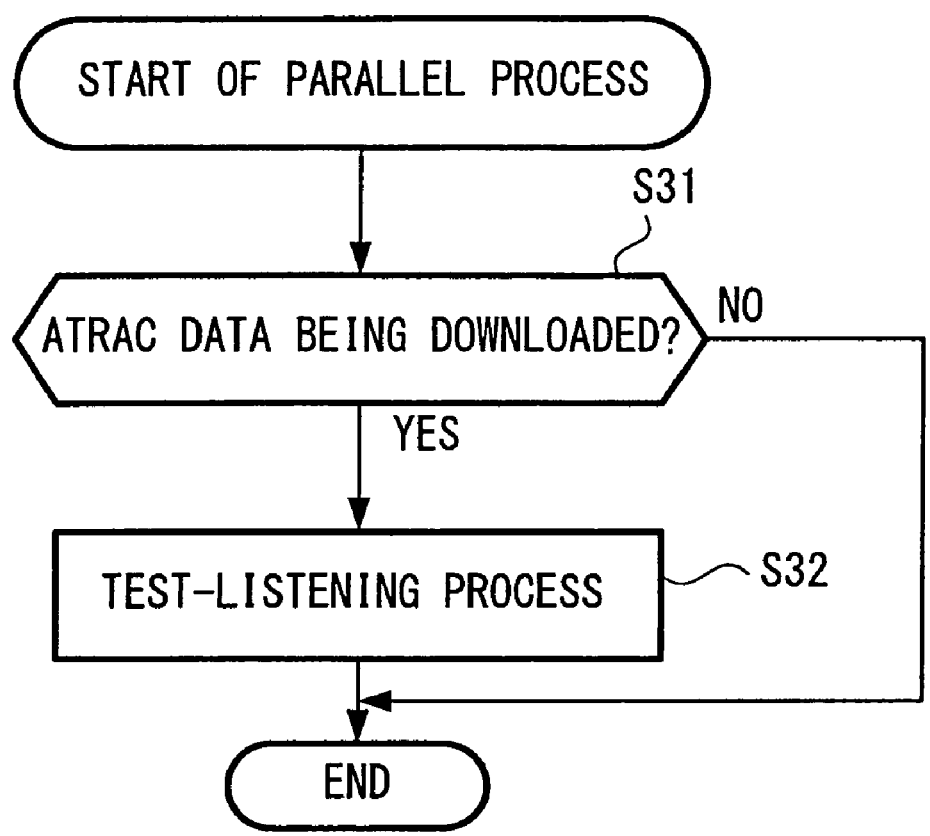
FIG. 16 is a flowchart for explaining a parallel process of the IRD 5.

In the embodiment, however, the two kinds of MPEG audio data and ATRAC data exist as music piece data for downloading as described above. At the time of test-listening the musical piece, the MPEG audio data in the two kinds of data is reproduced. Therefore, the MPEG audio data can be test-listened while downloading the ATRAC data. The parallel process will be described with reference to the flowchart of FIG. 16.

Figure 13:
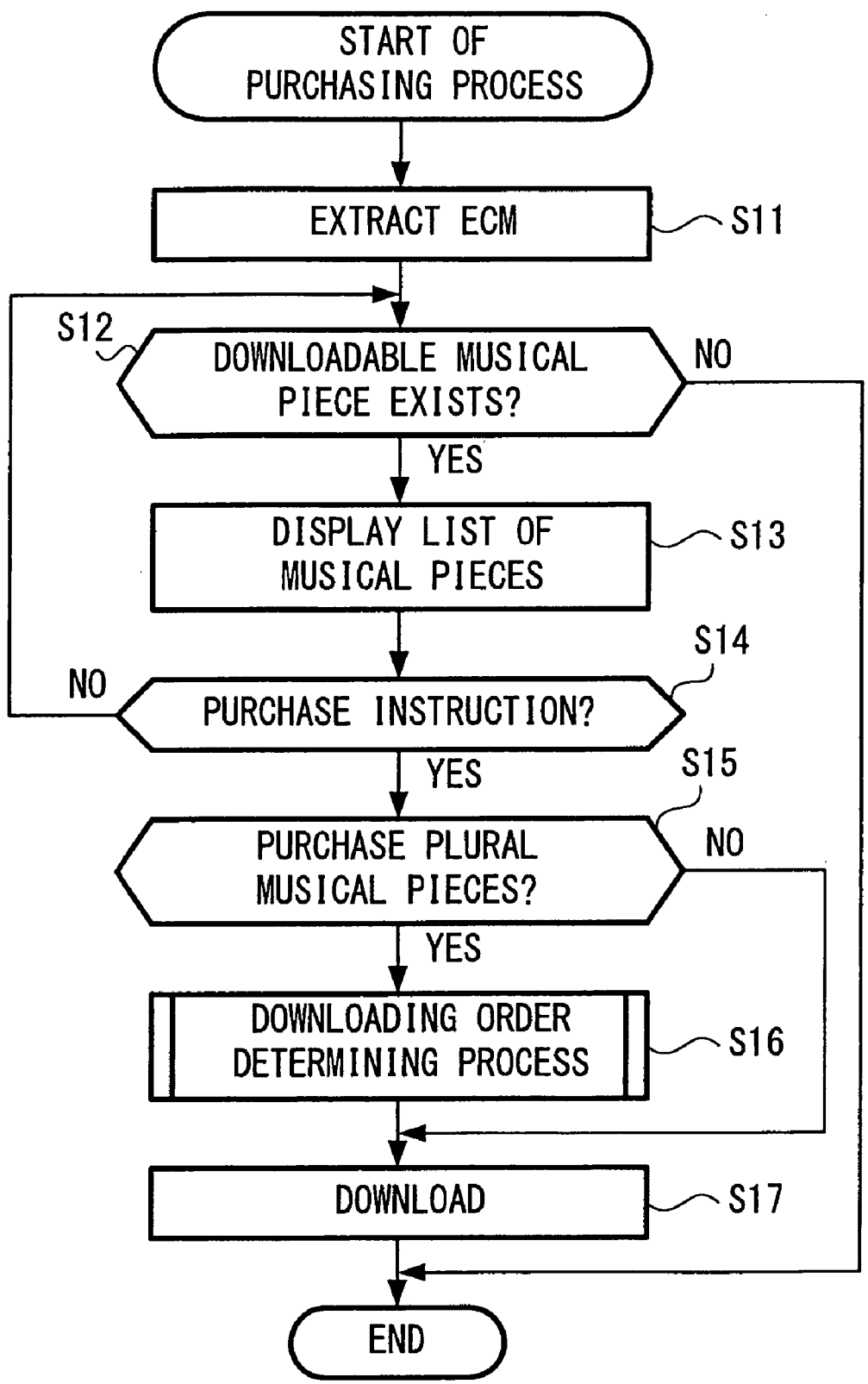
FIG. 13 is a flowchart for explaining a purchasing process of the IRD 5.

The parallel process is executed simultaneously with the downloading process in step S17 in FIG. 13. When the control unit 39 determines whether the music piece data being downloaded is ATRAC data or not and determines that the music piece data being downloaded is ATRAC data in step S31, the program advances to step S32. In step S32, the control unit 39 executes the above-described test-listening process (FIG. 11). The same music piece as that of the ATRAC data being downloaded and the music piece which has already been downloaded cannot be test-listened.

When it is determined in step S31 that the music piece data being downloaded is not the ATRAC data (that the music piece data being downloaded is MPEG audio data), step S32 is skipped.

Alternately, in step S32, MPEG audio data on a music piece different from the ATRAC data being downloaded can be purchased.

By executing such a parallel process, a music piece can be test-listened during loading another musical piece, and music piece data on two different musical pieces (ATRAC data on a music piece and MPEG audio data on another musical piece) can be simultaneously downloaded.

Figure 17:
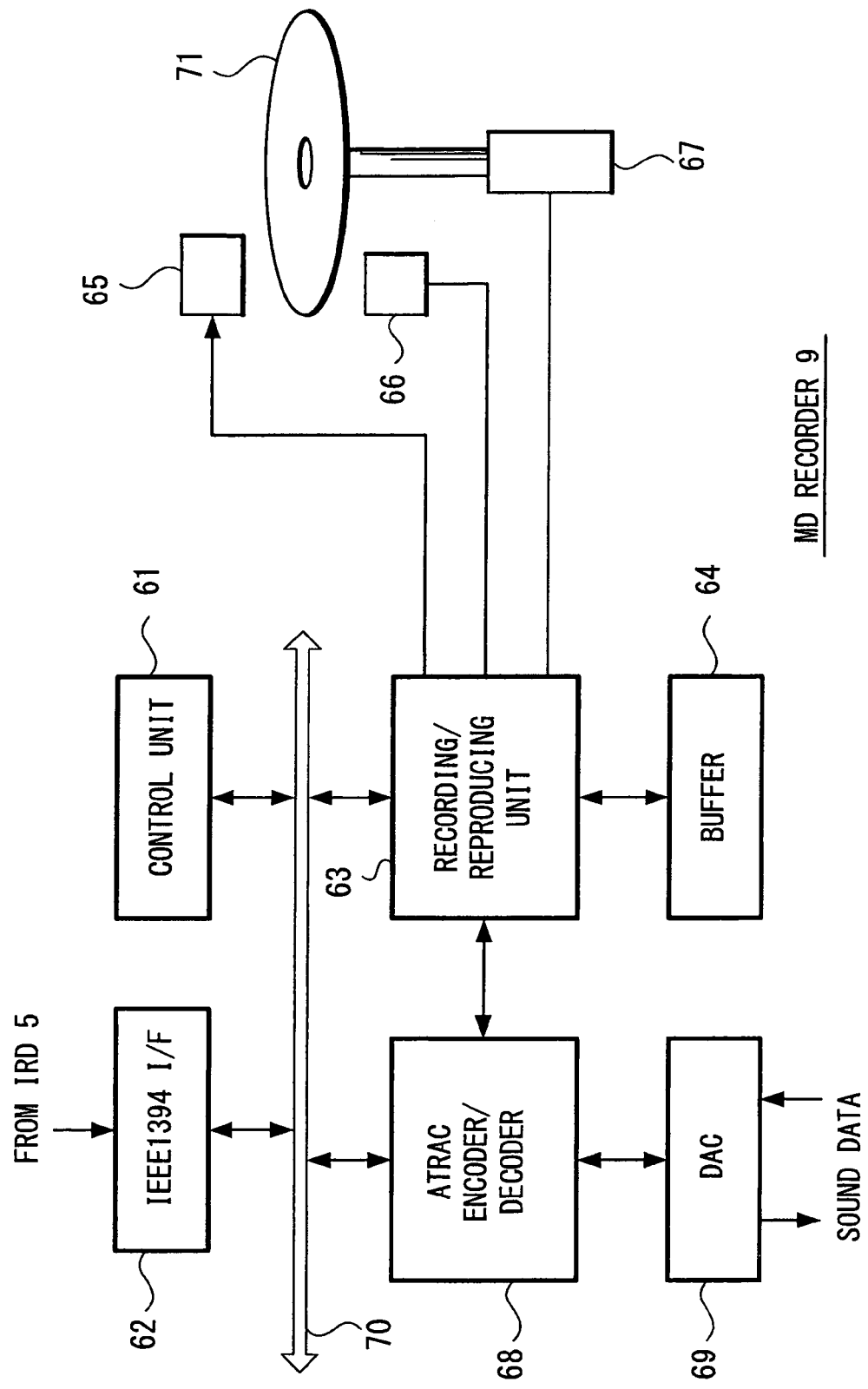
FIG. 17 is a block diagram showing an example of the configuration of an MD recorder 9 in FIG. 1.

An example of the configuration of the MD deck 9 connected to the IRD 5 via the IEEE1394 bus 8 will now be described with reference to FIG. 17. The MD deck 9 is constructed in such a manner that a control unit 61 for controlling each of the units in the MD deck 9, an IEEE1394 interface 62 for receiving the partial TS including the ATRAC data from the IRD 5, a recording/reproducing unit 63 for controlling recording/reproducing of the ATRAC data to/from an MD 71, and an ATRAC encoder/decoder 68 for decoding the ATRAC data from the recording/reproducing unit 63 and outputting the decoded data to a DAC 69 or encoding digital audio data from the DAC 69 and outputting the encoded data to the recording/reproducing unit 63 are connected to each other via a system bus 70.

To the recording/reproducing unit 63, a buffer 64 for temporarily storing ATRAC data to be recorded on an MD, a magnetic head 65, an optical pickup 66, and a spindle motor 67 are connected. At the time of recording, the optical pickup 66 emits a laser beam onto the MD 71 to increase the temperature of the spot irradiated with the laser beam to a predetermined value. The magnetic head 65 records a magnetic signal corresponding to the ATRAC data supplied from the recording/reproducing unit 63 to the spot on the MD 71, at which the temperature is increased to the predetermined value by the laser beam from the optical pickup 66. The optical pickup 66 irradiates the MD 71 with a laser beam at the time of reproduction, receives reflection light of the laser beam, converts the reflection light to an electric signal, and outputs obtained ATRAC data to the recording/reproducing unit 63. The spindle motor 67 rotates the MD 71 on the basis of the control from the recording/reproducing unit 63.

The DAC 69 for conversion between digital and analog signals is connected to the ATRAC encoder/decoder 68.

The operation will now be described. At the time of recording, a PES packet including the ATRAC data is detected on the basis of the PSI packet multiplexed on the partial TS from the IRD 5 and, further, only the ATRAC data is extracted from the PES packet. The extracted ATRAC data is supplied to the recording/reproducing unit 63 via the system bus 70. The recording/reproducing unit 63 controls the optical head 65, optical pickup 66, and spindle motor 67 to record the ATRAC data supplied from the IEEE1394 interface 62 onto the MD 71.

At the time of reproduction, the recording/reproducing unit 63 controls the optical pickup 66 and the spindle motor 67 to read the ATRAC data from the MD 71 and supplies the ATRAC data to the ATRAC encoder/decoder 68. In the ATRAC encoder/decoder 68, the ATRAC data supplied from the recording/reproducing unit 63 is decoded and resultant data is outputted to, for example, a speaker via the DAC 69.

Figure 18:
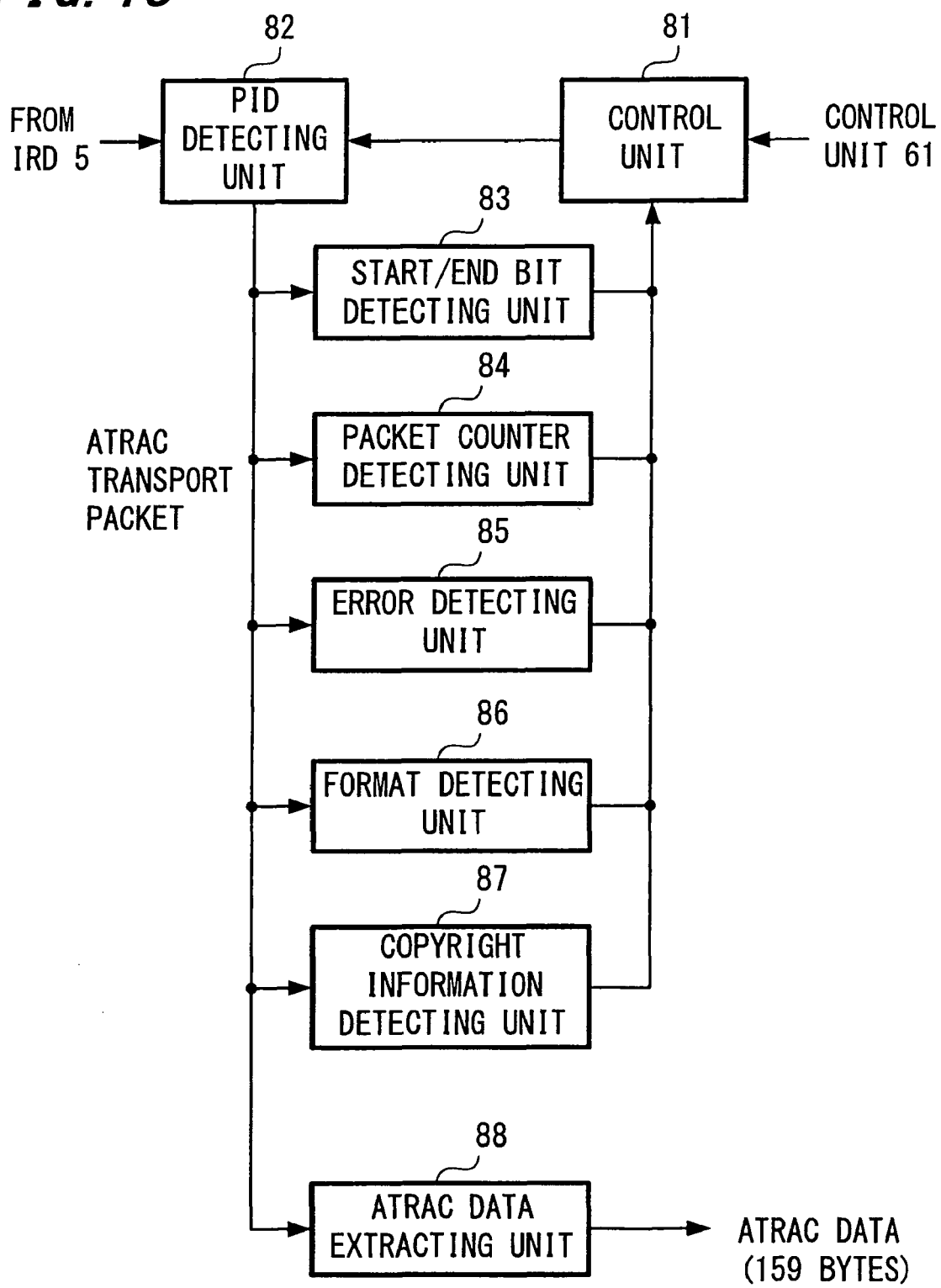
FIG. 18 is a block diagram showing an example of the configuration of an IEEE1394 interface 62 in FIG. 17.

FIG. 18 shows an example of the detailed configuration of the IEEE1394 interface 62. A control unit 81 controls processes of a PID detecting unit 82 in response to predetermined information supplied from the control unit 61 and a start/end bit detecting unit 83 to an ATRAC data extracting unit 88.

The PID detecting unit 82 converts the partial TS supplied from the IRD 5 into an MPEG stream, extracts only the TS packet whose PID (FIG. 13) of 13 bits written in the packet header is equal to a predetermined PID (PID indicative of the TS packet including the ATRAC data) designated by the control unit 81 from the TS packets, and outputs the extracted TS packet to the start/end bit detecting unit 83 and to ATRAC data extracting unit 88 at the post stage.

The start/end bit detecting unit 83 detects a data start indicator (in the 23rd byte in the TS packet shown in FIG. 8) in the TS packet sequentially supplied from the PID detecting unit 82. When "1" is written in the data start indicator, the detection information is outputted to the control unit 81. The detection information is supplied to the control unit 61 via the control unit 81 and is used as a trigger to start recording the ATRAC data onto the MD 71. The start/end bit detecting unit 83 detects a data end indicator (the bit next to the LSB side of the data start indicator) in the TS packet. When "1" is written in the data end indicator, the detection information is outputted to the control unit 81. The detection information is supplied to the control unit 61 via the control unit 81 and is used as a trigger to finish the recording of the ATRAC data onto the MD 71.

The packet counter detecting unit 84 ascertains continuity of the PES data counter (three bits next to the LSB side of the data end indicator) of the TS packet sequentially supplied from the PID detecting unit 82 and a present PES number (from the 24th byte to the 26th byte in the TS packet shown in FIG. 8).

Meanwhile, the PES data counter is a cyclic counter of the values from 0 to 7. The present PES number is incremented by one each time the value of the PES data counter is restarted from 0 after 7. That is, in the PES data counter of the first TS packet among eight TS packets constructing a PES packet of a continuous normal TS (TS where no packet dropout occurs), "1" is written. In the PES data counters of the subsequent TS packets, values incremented one by one are sequentially written. In the PES data counter of the eighth TS packet in the PES packet, "7" is written. The present PES number of the eight TS packets is commonly used. In the PES data counters of eight TS packets subsequent to the above TS packets, values from 0 to 7 incremented one by one are written again. Each of the present PES numbers is obtained by adding "1" to the value written in the PES number of the preceding eight TS packets. The value of the present PES number of the head TS packet of the ATRAC data having the data start indicator in which "1" is written is zero.

When the value of the PES data counter of a TS packet inputted and the value of the present PES number are read and stored and discontinuity of the value of the PES data counter of a TS packet supplied next and the value of the present PES number is detected, the packet counter detecting unit 84 outputs the information to the control unit 81.

The error detecting unit 85 detects the TS error indicator in the second byte in the TS packet sequentially inputted from the PID detecting unit 82 and determines whether "1" is written or not in the TS error indicator. "1" is written in the TS error indicator when an error correcting process cannot be completed in the front end unit 31 in the IRD 5. When "1" is written in the TS error indicator, therefore, it can be considered that at least one error is included in the TS packet. When it is determined that "1" is written in the TS error indicator, the error detecting unit 85 outputs the information to the control unit 81. When the ATRAC data described in the 30th and subsequent bytes is checked by using the ATRAC data checksum in the 29th byte in the TS packet and an error is detected, the error detecting unit 85 outputs the detection information to the control unit 81.

The format detecting unit 86 detects the data type (in the 19th byte in the TS packet shown in FIG. 6) of a TS packet subsequently inputted from the PID detecting unit 82, data transmission type (in the 20th byte in the TS packet shown in FIG. 6), FDF field length (in the 21st byte in the TS packet shown in FIG. 8), and audio data types 1 and 2 (in the 21st and 22nd bytes in the TS packet shown in FIG. 8) to check whether or not each of the values written in the bytes is equal to a predetermined value indicative of a packet including ATRAC data. When it is determined that each of the values is not equal to the predetermined value, the format detecting unit 86 outputs the detection information to the control unit 81.

The copyright information detecting unit 87 detects the copyright, original or copy, copyright mode, and EMI mode (in the 22nd and 23rd bytes in the TS packet shown in FIG. 8) of the TS packet sequentially inputted from the PID detecting unit 82 and checks whether or not each of the values is equal to a predetermined value indicating that the ATRAC data is permitted to be copied. When it is determined that each of the values is not equal to the predetermined value, the copyright information detecting unit 87 outputs the detection information to the control unit 81.

The ATRAC data extracting unit 88 extracts the ATRAC data placed in the 30th bytes to 188th bytes in the TS packet inputted from the PID detecting unit 82 and outputs the detected data to the post stage.

Figure 19:
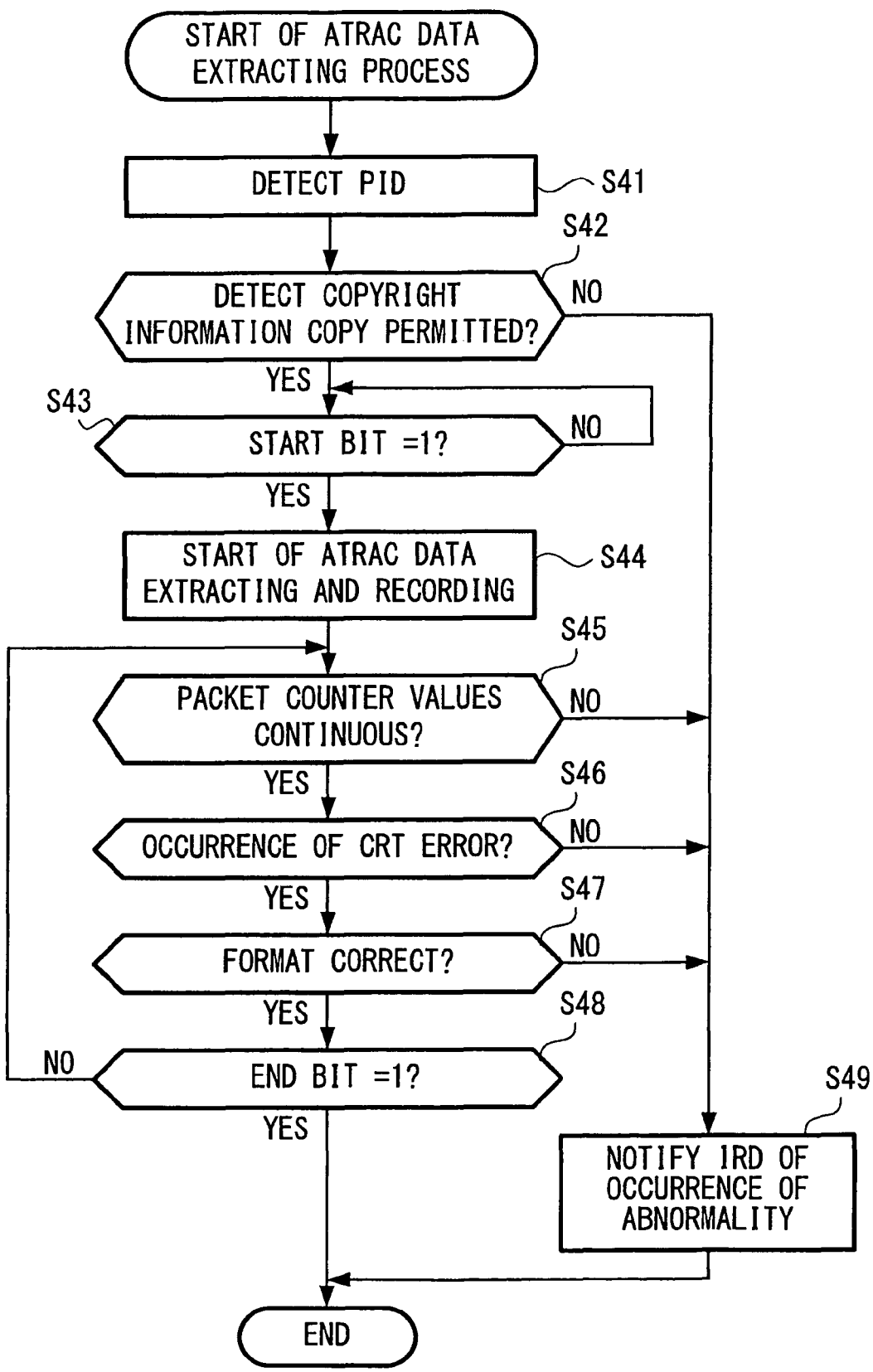
FIG. 19 is a flowchart for explaining an ATRAC data extracting process of the IEEE1394 interface 62.

The ATRAC data extracting process of the IEEE1394 interface 62 will now be described with reference to the flowchart of FIG. 19. The ATRAC data extracting process is started upon receipt of the partial TS from the IRD 5.

In step S41, the PID detecting unit 82 converts the partial TS inputted from the IRD 5 into an MPEG stream, after that, extracts only a TS packet having the PID of 13 bits written in the packet header equal to the PID indicative of the TS packet including the ATRAC data, and outputs the extracted TS packet to the start/end bit detecting unit 83 to the ATRAC data extracting unit 88 at the post stage.

In step S42, the copyright information detecting unit 87 detects the copyright, original or copy, copyright mode, and EMI mode of the TS packet sequentially inputted from the PID detecting unit 82 and checks whether or not each of the values is equal to a predetermined value indicating that the ATRAC data placed in the TS packet is permitted to be copied. When it is determined that each of the values is equal to the predetermined value and indicates that the ATRAC data is permitted to be copied, the program advances to step S43.

In step S43, the start/end bit detecting unit 83 monitors the data start indicator in the TS packet inputted from the PID detecting unit 82, waits until "1" is detected and, when "1" is detected, outputs the detection information to the control unit 81. In response to the detection information, the control unit 81 outputs a predetermined signal to the ATRAC data extracting unit 88 and the control unit 61.

In step S44, in response to the signal from the control unit 81, the ATRAC data extracting 88 extracts the ATRAC data placed in the 30th and subsequent bytes in the TS packet supplied from the PID detecting unit 82 and outputs the extracted ATRAC data to the recording/reproducing unit 63 at the post stage. The control unit 61 instructs each of the units in the MD deck 9 to start recording of the ATRAC data onto the MD 71 in response to the signal from the control unit 81, thereby starting the recording of the ATRAC data onto the MD 71.

In step S45, the packet counter detecting unit 84 detects the PES data counter and the present PES number in the TS packet supplied from the PID detecting unit 82 to check the continuity of the values written in the PES data counter and the present PES number. When it is determined that the values of each of the PES data counter and the present PES number in the TS packet have continuity, the program advances to step S46.

In step S46, the error detecting unit 85 detects a TS error indicator in the TS packet supplied from the PID detecting unit 82 and determines whether. "1" is written in the TS error indicator or not. Further, the error detecting unit 85 determines whether or not an error exists in the ATRAC data written in the 30th and subsequent bytes by using the ATRAC data checksum in the TS packet. When "1" is not written in the TS error indicator and it is determined that no error exists in the ATRAC data, the program advances to step S47.

In step S47, the format detecting unit 86 detects the data type, data transmission type, FDF field length, and audio data types 1 and 2 in the TS packet supplied from the PID detecting unit 82 and determines whether or not each of those values is equal to a predetermined value indicative of a packet including the ATRAC data. When it is determined that each of the written values is equal to the predetermined value indicative of a packet including the ATRAC data, the program advances to step S48.

In step S48, the start/end bit detecting unit 83 monitors the data end indicator in the TS packet supplied from the PID detecting unit 82 and determines whether "1" is written in the data end indicator or not. When it is determined that "1" is not written, the program returns to step S45, and the subsequent processes are repeated. On the contrary, when it is determined that "1" is written in the data end indicator, the start/end bit detecting unit 83 outputs the detection information to the control unit 81. In response to the detection information, the control unit 81 outputs a predetermined signal to the ATRAC data extracting unit 88 and the control unit 61. In response to the signal from the control unit 81, the ATRAC data extracting unit 88 finishes extracting the ATRAC data from the TS packet supplied from the PID detecting unit 82. In response to the signal from the control unit 81, the control unit 61 instructs each of the units in the MD deck 9 to finish the recording of the ATRAC data onto the MD 71, thereby finishing the recording of the ATRAC data onto the MD 71.

In step S42, when the value written in each of the copyright, original or copy, copyright mode, and EMI mode of the TS packet sequentially inputted from the PID detecting unit 82 is not equal to a predetermined value indicating that the ATRAC data placed in the TS packet is permitted to be copied and it is determined that the ATRAC data is not permitted to be copied, the result of the determination is outputted from the copyright information detecting unit 87 to the control unit 81 and the program advances to step S49.

In step S45, when it is determined that the values of each of the PES data counter and the present PES number in the TS packet supplied from the PID detecting unit 82 do not have continuity, the determination result is outputted from the packet counter detecting unit 84 to the control unit 81 and the program advances to step S49.

In step S46, when it is determined that "1" is written in the TS error indicator in the TS packet supplied from the PID detecting unit 82, or when it is determined that an error exists in the ATRAC data, the detection result is outputted from the error detecting unit 85 to the control unit 81 and the program advances to step S49.

In step S47, when it is determined that each of values written in the data type, data transmission type, FDF field length, and audio data types 1 and 2 in the TS packet supplied from the PID detecting unit 82 is not equal to a predetermined value indicative of a packet including the ATRAC data, the program advances to step S49.

In step S49, in response to the determination result from the packet counter detecting unit 84 to the copyright information detecting unit 87, the control unit 81 makes the PID detecting unit 82 stop extracting the TS packet and outputs the information to the control unit 61. In response to the information, the control unit 61 instructs each of the units in the MD deck 9 to stop the recording of the ATRAC data onto the MD 71 and notifies the IRD 5 of the stop of recording.

The processes in steps S45 to S47 may be performed in different order or in parallel.

When it is considered that occurrence of an error on the transmission path of the TS is little (that is, the quality of the transmission path is good), the error detection using the checksum in step S46 is not executed but only the TS error indicator may be checked.

As described above, the IEEE1394 interface 62 in the MD 9 extracts only the ATRAC data placed in the TS packet. At this time, abnormality (data dropout, occurrence of an error, and the like) which occurs in the TS packet is monitored. When abnormality is detected, the extraction of the ATRAC data is stopped. Thus, a failure in downloading such that abnormal ATRAC data is recorded can be suppressed.

In the EMD system as the embodiment, the invention is applied to digital satellite broadcasting. The invention can be also applied to digital cable television broadcasting and digital ground broadcasting.

The invention is not limited to the audio data distributing service but can be applied to, for example, service of distributing a program processed by a computer or a television game machine.

Referring to FIG. 20, a medium used for installing a program of executing the series of processes to the IRD or MD deck to set a state in which the program can be executed by the IRD or MD deck will now be described.

Figure 20A:
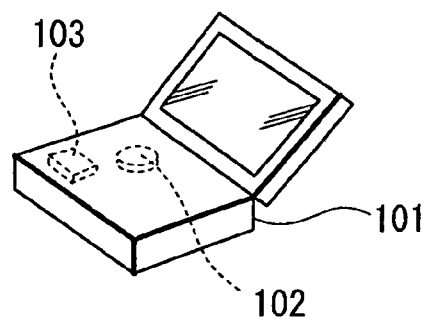
FIG. 20 is a diagram for explaining media.

As shown in FIG. 20A, the program conformed to the IRD can be provided to the user in a state where it is pre-installed on a hard disk 102 or a semiconductor memory 103 as a recording medium provided in an IRD 101 (corresponding to the IRD 5 in FIG. 1).

Figure 20B:
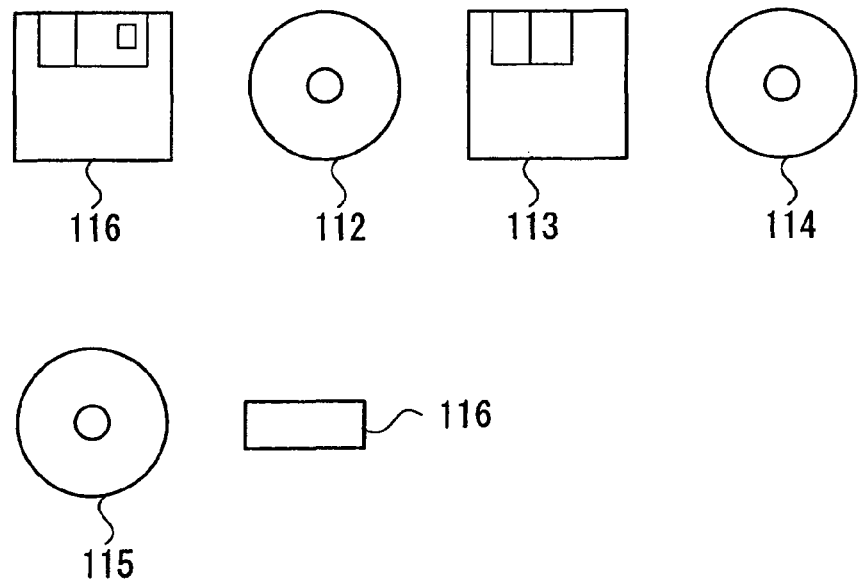

Alternately, as shown in FIG. 20B, the program can be temporarily or permanently stored in a recording medium such as a floppy disk 111, a CD-ROM (Compact Disc-Read Only Memory) 112, an MO (Magneto Optical) disk 113, a DVD (Digital Versatile Disc) 114, a magnetic disk 115, or a semiconductor memory 116, and can be provided as package software.

Figure 20C:
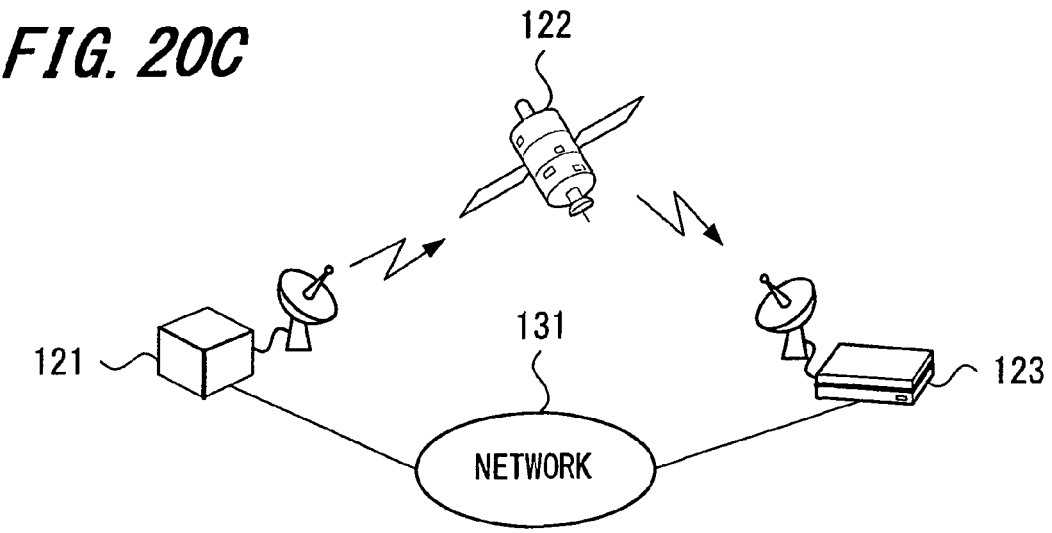

Further, as shown in FIG. 20C, the program can be transferred by radio from a download site 121 to an IRD 123 via a satellite 122 or transferred by a wire or by radio to the IRD 123 via a network 131 such as a local area network or the Internet. The program can be stored into a built-in hard disk or the like in the IRD 123.

Since a program conformed to the MD deck is similar to that conformed to the IRD, its description is omitted here.

The medium in the specification has a concept in a broad sense including all the above media.

In the specification, the steps of writing a program provided by the medium include not only processes time-sequentially performed according to the written order but also processes which are not always processed time-sequentially but are executed in parallel or individually.

Although the example in which data in the MHEG format is transmitted as data for GUI or the like distributed from a broadcast station side has been described in the foregoing embodiment, the invention can be also applied to a case where data is transmitted as data in another format. For example, the invention can be also applied to a case where data in the HTML (Hyper Text Make-up Language) format or data in the XML (extensive Markup Language) format is transmitted.

In the specification, the system denotes the whole equipment constructed by a plurality of equipments.

The invention claimed is:

1. Receiving equipment for receiving a transport stream obtained by repeatedly multiplexing a plurality of pieces of content data, the receiving equipment comprising:

reading means for reading predetermined information corresponding to the plurality of pieces of content data from the transport stream;

receiving means for receiving designation of at least some of the plurality of pieces of content data from a user;

determining means for determining, with reference to the predetermined information read by the reading means, an order of extracting the designated pieces of content data from the transport stream based on a predetermined algorithm whereby (i) a given one of the designated pieces of content data having a currently earliest transmission start time is next extracted until completion of the transmission of the given piece and (ii) step (i) is repeated until all of the designated pieces of content data are extracted;

extracting means for extracting the designated pieces of content data from the transport stream in accordance with the order determined by the determining means.

2. The receiving equipment according to claim 1, further comprising:

display control means for controlling, when the extracting means cannot extract the designated pieces of content data within a predetermined time, display of a message that the designated pieces of content data cannot be extracted.

3. The receiving equipment according to claim 1, wherein the predetermined information corresponding to the plurality of pieces of content data includes a respective transmission time of each of the plurality of pieces of content data.

4. The receiving equipment according to claim 1, wherein the predetermined information corresponding to the plurality of pieces of content data includes a respective transmission elapsed time of each of the plurality of pieces of content data.

5. The receiving equipment according to claim 1, wherein the predetermined information corresponding to the plurality of pieces of content data includes a respective play time of each of the plurality of pieces of content data.

6. The receiving equipment according to claim 1, wherein the predetermined information corresponding to the plurality of pieces of content data includes a respective play elapsed time of each of the plurality of pieces of content data.

7. A method for receiving a transport stream obtained by repeatedly multiplexing a plurality of pieces of content data, the method comprising:

reading predetermined information corresponding to the plurality of pieces of content data from the transport stream;

receiving designation of at least some of the plurality of pieces of content data from a user;

determining, with reference to the predetermined information read in the reading step, an order of extracting the designated pieces of content data from the transport stream based on a predetermined algorithm whereby (i) a given one of the designated pieces of content data having a currently earliest transmission start time is next extracted until completion of the transmission of the given piece and (ii) step (i) is repeated until all of the designated pieces of content data are extracted.

8. The method according to claim 7, further comprising:

controlling, when the designated pieces of content data cannot be extracted within a predetermined time, display of a message the designated pieces of content data cannot be extracted.

9. The method according to claim 7, wherein the predetermined information corresponding to the plurality of pieces of content data includes a respective transmission time of each of the plurality of pieces of content data.

10. The method according to claim 7, wherein the predetermined information corresponding to the plurality of pieces of content data includes a respective transmission elapsed time of each of the plurality of pieces of content data.

11. The method according to claim 7, wherein the predetermined information corresponding to the plurality of pieces of content data includes a respective play time of each of the plurality of pieces of content data.

12. The method according to claim 7, wherein the predetermined information corresponding to the plurality of pieces of content data includes a respective play elapsed time of each of the plurality of pieces of content data.

13. Receiving equipment for receiving a transport stream obtained by multiplexing plural encoded data encoded by different systems, the receiving equipment comprising:
  first extracting means for extracting first encoded data from the transport stream received;
  first outputting means for outputting the first encoded data extracted by the first extracting means;
  second extracting means for extracting second encoded data from the transport stream received;
  decoding means for decoding the extracted second encoded data to generate audio data; and
  second outputting means for outputting the generated audio data,
  wherein the first encoded data is compressed audio data encoded using an ATRAC system, and the second encoded data is compressed audio data encoded using an MPEG2 system.

14. A method for receiving a transport stream obtained by multiplexing plurally encoded data encoded by different systems, the method comprising:
  extracting first encoded data from the transport stream received;
  outputting the extracted first encoded data;
  extracting second encoded data from the transport stream received;
  decoding the extracted second encoded data to generate audio data; and
  outputting the generated audio data,
  wherein the first encoded data is compressed audio data encoded using an ATRAC system, and the second encoded data is compressed audio data encoded using an MPEG2 system.

* * * * *